(12) United States Patent
Kanehara

(10) Patent No.: US 10,539,234 B2
(45) Date of Patent: Jan. 21, 2020

(54) VEHICLE AND VEHICLE CONTROL METHOD

(71) Applicant: HONDA MOTOR CO., LTD., Minato-ku, Tokyo (JP)

(72) Inventor: Shigeru Kanehara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 86 days.

(21) Appl. No.: 15/975,969

(22) Filed: May 10, 2018

(65) Prior Publication Data
US 2018/0328482 A1    Nov. 15, 2018

(30) Foreign Application Priority Data

May 15, 2017 (JP) ................................. 2017-096266
May 15, 2017 (JP) ................................. 2017-096270

(51) Int. Cl.
| | | |
|---|---|---|
| *F16H 61/662* | (2006.01) | |
| *F16H 61/14* | (2006.01) | |
| *F16H 59/68* | (2006.01) | |
| *F16H 59/44* | (2006.01) | |
| *F16H 59/66* | (2006.01) | |
| *F16H 59/14* | (2006.01) | |

(52) U.S. Cl.
CPC ......... *F16H 61/662* (2013.01); *F16H 61/143* (2013.01); *F16H 59/14* (2013.01); *F16H 59/44* (2013.01); *F16H 59/66* (2013.01); *F16H 59/68* (2013.01); *F16H 2059/663* (2013.01); *F16H 2061/66277* (2013.01)

(58) Field of Classification Search
CPC .. F16H 61/662; F16H 2059/366; F16H 59/38; F02D 2400/12; B60Y 2300/20
See application file for complete search history.

(56) References Cited

U.S. PATENT DOCUMENTS

| | | | |
|---|---|---|---|
| 9,057,438 B2 * | 6/2015 | Sakagami | ............... F16H 61/02 |
| 10,252,719 B2 * | 4/2019 | Honma | ................. F16H 61/662 |

FOREIGN PATENT DOCUMENTS

| | | |
|---|---|---|
| JP | 05-071628 | 3/1993 |
| JP | 2004-239769 | 8/2004 |
| JP | 2010-159884 | 7/2010 |
| JP | 2011-247306 | 12/2011 |

(Continued)

OTHER PUBLICATIONS

Japanese Office Action for Japanese Patent Application No. 2017-096266 dated Feb. 12, 2019.

(Continued)

*Primary Examiner* — Erin D Bishop
(74) *Attorney, Agent, or Firm* — Amin, Turocy & Watson, LLP

(57) ABSTRACT

A frequency of a harmonic of a drive source frequency of a rotary drive source is defined as a harmonic frequency, a resonant frequency of a torque transmitting rotary body is defined as a rotary body resonant frequency, and a resonant frequency of an endless belt is defined as a belt resonant frequency. A control device of a vehicle controls the belt resonant frequency in a manner so as to suppress a triple overlapping state in which the drive source frequency or the harmonic frequency, the rotary body resonant frequency, and the belt resonant frequency coincide with or closely approximate each other.

17 Claims, 15 Drawing Sheets

(56) References Cited

FOREIGN PATENT DOCUMENTS

| | | |
|---|---|---|
| JP | 2014-149064 | 8/2014 |
| JP | 2016-016732 | 2/2016 |
| JP | 2016-159743 | 9/2016 |

OTHER PUBLICATIONS

Japanese Office Action for Japanese Patent Application No. 2017-096270 dated Dec. 18, 2018.

* cited by examiner

VEHICLE AND VEHICLE CONTROL METHOD

CROSS-REFERENCE TO RELATED APPLICATIONS

This application is based upon and claims the benefit of priority from Japanese Patent Applications No. 2017-096266 filed on May 15, 2017, and No. 2017-096270 filed on May 15, 2017, the contents all of which are incorporated herein by reference.

BACKGROUND OF THE INVENTION

Field of the Invention

The present invention relates to a vehicle, which is capable of reducing the occurrence of vibrations or noises accompanying the generation or transmission of a drive torque, and also relates to a control method for the vehicle.

Description of the Related Art

Japanese Laid-Open Patent Publication No. 2014-149064 has the object of providing a control device for a continuously variable transmission, in which, by means of a simple control and with a simple structure in which the number of parts is kept at a low number, it is possible to more reliably reduce noises and vibrations caused by a power transmission member biting into a drive pulley (see paragraph [0012], abstract).

In order to achieve such an object, in Japanese Laid-Open Patent Publication No. 2014-149064 (abstract), a first power transmission unit and a second power transmission unit are provided. The first power transmission unit is disposed coaxially with a drive pulley, and changes a power transmission ratio from the engine to the drive pulley. Further, the second power transmission unit is disposed coaxially with a driven pulley, and changes the power transmission ratio from the driven pulley to the side of the driving wheels.

The control device acquires a frequency of engagement of a metal chain, which is wound between the drive pulley and the driven pulley, to the pulleys, the resonant frequency of chord parts at a tensioned side and a loosened side of the metal chain, and a resonant frequency of the drive pulley or the driven pulley. Further, when any two or three of such frequencies coincide with each other, the control device carries out a control to generate a slight slippage in the power transmission of at least one of the first power transmission unit and the second power transmission unit. Consequently, the vibrations are converted into heat and attenuated. Thus, vibrations and noises caused by the power transmission member biting into the drive pulley or the like can reliably be reduced (see paragraph [0014]).

SUMMARY OF THE INVENTION

As described above, according to Japanese Laid-Open Patent Publication No. 2014-149064, when any two or three of the frequency of engagement of the metal chain with the pulleys, the resonant frequency of the chord parts at the tensioned side and the loosened side of the metal chain, and the resonant frequency of the drive pulley or the driven pulley coincide with each other, the vibrations are converted into heat and attenuated (abstract). Consequently, vibrations and noises caused by the power transmission member biting into the drive pulley or the like can be reduced (see paragraph [0014]). However, Japanese Laid-Open Patent Publication No. 2014-149064 has room for improvement in relation to reducing vibrations or noises accompanying the generation or transmission of a drive torque.

The present invention has been devised taking into consideration the aforementioned problems, and has the object of providing a vehicle and a control method therefore, in which vibrations or noises accompanying the generation or transmission of a drive torque can be more suitably reduced.

A vehicle according to an aspect of the present invention includes:

a rotary drive source configured to generate a drive torque for the vehicle;

a continuously variable transmission arranged in a power transmission path from the rotary drive source to the vehicle wheels, and including a drive pulley, a driven pulley, and an endless belt;

a torque transmitting rotary body configured to transmit the drive torque in the power transmission path;

a drive source frequency sensor configured to acquire a drive source frequency, which is a rotational frequency of the rotary drive source; and a control device configured to control the continuously variable transmission;

wherein, when a frequency of a harmonic of the drive source frequency is defined as a harmonic frequency, a resonant frequency of the torque transmitting rotary body is defined as a rotary body resonant frequency, and a resonant frequency of the endless belt is defined as a belt resonant frequency, the control device controls the belt resonant frequency in a manner so as to suppress a triple overlapping state in which the drive source frequency or the harmonic frequency, the rotary body resonant frequency, and the belt resonant frequency coincide with or closely approximate each other.

According to the present invention, the belt resonant frequency is controlled in a manner so as to suppress the state (triple overlapping state) in which the drive source frequency or the harmonic frequency, the rotary body resonant frequency, and the belt resonant frequency coincide with or closely approximate each other. Consequently, it is possible to suppress the occurrence of vibrations or noises due to the triple overlapping state.

When the triple overlapping state is detected or predicted, the control device may temporarily change a force (a ring tension, a pressing force of an element, or the like) that acts on the endless belt in a direction of movement of the endless belt, and may thereby temporarily change the belt resonant frequency. In accordance with this feature, it is possible to more reliably suppress the triple overlapping state.

The vehicle may further include a vehicle velocity sensor configured to acquire the vehicle velocity of the vehicle. Further, the control device may include a storage unit configured to store a map defining a relationship between the triple overlapping state, and a combination of the drive source frequency and the vehicle velocity. Furthermore, the control device may detect or predict the triple overlapping state on the basis of the combination of the drive source frequency and the vehicle velocity in the map. In accordance with this feature, it is possible to more reliably suppress the triple overlapping state.

The vehicle may further include a rotary body variation amount sensor configured to acquire a variation amount of the torque transmitting rotary body. Further, the control device may detect or predict the triple overlapping state on the basis of the rotary body variation amount. In accordance with this feature, it is possible to detect or predict the triple overlapping state based on the actual state of the torque transmitting rotary body.

The storage unit may store a plurality of the maps defining the relationship between the triple overlapping state, and the combination of the drive source frequency and the vehicle velocity, one map for each of the rotary body variation amounts. Further, the control device may switch the map on the basis of the rotary body variation amounts. In accordance with this feature, it is possible to detect or predict the triple overlapping state with high accuracy.

The vehicle may be a vehicle (a part-time four-wheel drive vehicle) which is capable of switching between a four-wheel drive state and a two-wheel drive state. The rotary drive source may be an engine, for example. The torque transmitting rotary body may be a propeller shaft, for example. The control device may execute switching of the belt resonant frequency in order to suppress the triple overlapping state, on the condition that the vehicle is in the two-wheel drive state. In accordance with these features, the belt resonant frequency is switched so as to suppress the state (triple overlapping state) in which the engine frequency or the harmonic frequency, the propeller shaft resonant frequency, and the belt resonant frequency coincide with or closely approximate each other. Consequently, it is possible to suppress the occurrence of vibrations or noises due to the triple overlapping state.

Further, switching of the belt resonant frequency in order to suppress the triple overlapping state is performed only in the two-wheel drive state, and is not performed in the four-wheel drive state. Consequently, in the case that vibration of the propeller shaft is likely to occur when the two-wheel drive state is in effect, it is possible to carry out switching of the belt resonant frequency in an appropriate situation.

The vehicle may further include an inclination determining unit configured to determine inclinations of a travel path of the vehicle. The storage unit may store a plurality of the maps defining the relationship between the triple overlapping state, and the combination of the drive source frequency and the vehicle velocity, one map for each of the inclinations. The control device may switch the map depending on the inclination. In accordance with this feature, it is possible to suppress the triple overlapping state in accordance with the inclination of the travel path.

The vehicle may further include a lockup clutch. Further, when the triple overlapping state is detected or predicted, the control device may change a state of engagement of the lockup clutch. In accordance with this feature, it is possible to more reliably suppress the triple overlapping state.

A control method for a vehicle according to another aspect of the present invention is characterized in that the vehicle includes:

a rotary drive source configured to generate a drive torque for the vehicle;

a continuously variable transmission arranged in a power transmission path from the rotary drive source to the vehicle wheels, and including a drive pulley, a driven pulley, and an endless belt;

a torque transmitting rotary body configured to transmit the drive torque in the power transmission path;

a drive source frequency sensor configured to acquire a drive source frequency, which is a rotational frequency of the rotary drive source; and a control device configured to control the continuously variable transmission; and the control method includes, with the control device, controlling a belt resonant frequency in a manner so as to suppress a triple overlapping state in which the drive source frequency or a harmonic frequency, a rotary body resonant frequency, and a belt resonant frequency coincide with or closely approximate each other, wherein the harmonic frequency denotes a frequency of a harmonic of the drive source frequency, the rotary body resonant frequency denotes a resonant frequency of the torque transmitting rotary body, and the belt resonant frequency denotes a resonant frequency of the endless belt.

A vehicle according to another aspect of the present invention includes:

a rotary drive source configured to generate a drive torque for the vehicle;

a continuously variable transmission arranged in a power transmission path from the rotary drive source to the vehicle wheels, and including a drive pulley, a driven pulley, and an endless belt;

a torque transmitting rotary body configured to transmit the drive torque in the power transmission path;

a drive source frequency sensor configured to acquire a drive source frequency, which is a rotational frequency of the rotary drive source;

a vehicle velocity sensor configured to acquire a vehicle velocity of the vehicle; and a control device configured to control the rotary drive source based on the drive source frequency and the vehicle velocity;

wherein, when a frequency of a harmonic of the drive source frequency is defined as a harmonic frequency, a resonant frequency of the torque transmitting rotary body id defined as a rotary body resonant frequency, and a resonant frequency of the endless belt is defined as a belt resonant frequency, the control device controls the drive source frequency in a manner so as to suppress a triple overlapping state in which the drive source frequency or the harmonic frequency, the rotary body resonant frequency, and the belt resonant frequency coincide with or closely approximate each other.

According to the present invention, the drive source frequency is controlled in a manner so as to suppress the state (triple overlapping state) in which the drive source frequency or the harmonic frequency, the rotary body resonant frequency, and the belt resonant frequency coincide with or closely approximate each other. Consequently, it is possible to suppress the occurrence of vibrations or noises due to the triple overlapping state.

The control device may include a storage unit configured to store a map defining a relationship between the drive source frequency and the vehicle velocity. Further, in the map, the relationship between the drive source frequency and the vehicle velocity may be defined so as to suppress the triple overlapping state. In accordance with this feature, the map is set in advance so as to avoid a state (triple overlapping state) in which the drive source frequency or the harmonic frequency, the rotary body resonant frequency, and the belt resonant frequency coincide with or closely approximate each other. Therefore, it is possible to avoid the triple overlapping state, while also reducing the computational load during traveling of the vehicle.

The vehicle may further include a rotary body variation amount sensor configured to acquire rotary body variation amounts, which are variation amounts of the torque transmitting rotary body. Further, the storage unit may store a plurality of the maps defining the relationship between the drive source frequency and the vehicle velocity, one map for each of the rotary body variation amounts. The control device may switch the map on the basis of the rotary body variation amounts. In accordance with this feature, it is possible to detect or predict the triple overlapping state based on the actual state of the torque transmitting rotary body.

The control device may detect or predict the triple overlapping state on the basis of the rotary body variation amount. In accordance with this feature, it is possible to detect or predict the triple overlapping state based on the actual state of the torque transmitting rotary body.

The vehicle may be a vehicle (a part-time four-wheel drive vehicle) which is capable of switching between a four-wheel drive state and a two-wheel drive state. The rotary drive source may be an engine, for example. The torque transmitting rotary body may be a propeller shaft, for example. The control device may execute the control of the drive source frequency in order to suppress the triple overlapping state, on the condition that the vehicle is in the two-wheel drive state. In accordance with these features, the drive source frequency is controlled so as to suppress the state (triple overlapping state) in which the engine frequency or the harmonic frequency, the propeller shaft resonant frequency, and the belt resonant frequency coincide with or closely approximate each other. Consequently, it is possible to suppress the occurrence of vibrations or noises due to the triple overlapping state.

Further, control of the drive source frequency in order to suppress the triple overlapping state is performed only in the two-wheel drive state, and is not performed in the four-wheel drive state. Consequently, in the case that vibration of the propeller shaft is likely to occur when the two-wheel drive state is in effect, it is possible to control the drive source frequency in an appropriate situation.

The vehicle may further include an inclination determining unit configured to determine an inclination of a travel path of the vehicle. Further, the control device may switch a correspondence relationship between the drive source frequency and the vehicle velocity depending on the inclination. In accordance with this feature, it is possible to suppress the triple overlapping state in accordance with the inclination of the travel path.

The vehicle may further include a lockup clutch. Further, when the triple overlapping state is detected or predicted, the control device may change a state of engagement of the lockup clutch. In accordance with this feature, it is possible to more reliably suppress the triple overlapping state.

A control method for a vehicle according to another aspect of the present invention is characterized in that the vehicle includes:

a rotary drive source configured to generate a drive torque for the vehicle;

a continuously variable transmission arranged in a power transmission path from the rotary drive source to the vehicle wheels, and including a drive pulley, a driven pulley, and an endless belt;

a torque transmitting rotary body configured to transmit the drive torque in the power transmission path;

a drive source frequency sensor configured to acquire a drive source frequency, which is a rotational frequency of the rotary drive source;

a vehicle velocity sensor configured to acquire a vehicle velocity of the vehicle; and a control device configured to control the rotary drive source on the basis of the drive source frequency and the vehicle velocity; and the control method includes, with the control device, controlling the drive source frequency in a manner so as to suppress a triple overlapping state in which the drive source frequency or a harmonic frequency, a rotary body resonant frequency, and a belt resonant frequency coincide with or closely approximate each other, wherein the harmonic frequency denotes a frequency of a harmonic of the drive source frequency, the rotary body resonant frequency denotes a resonant frequency of the torque transmitting rotary body, and the belt resonant frequency denotes a resonant frequency of the endless belt.

According to the present invention, vibrations or noises accompanying the generation or transmission of a drive torque can be more suitably reduced.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

A. First Embodiment

A-1. Configuration of First Embodiment

[A-1-1. Overview]

Figure 1:
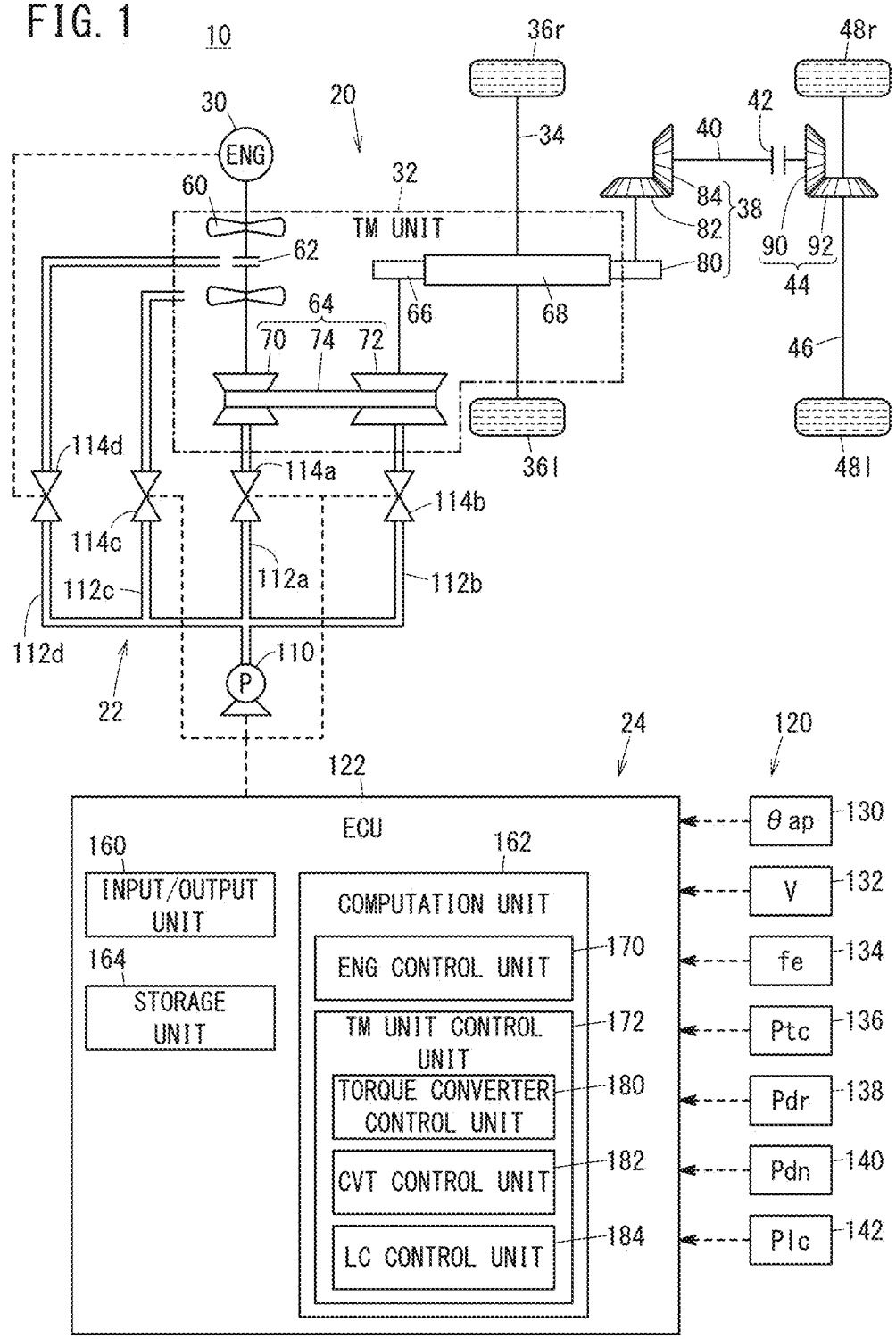
FIG. 1 is a schematic configuration diagram of a vehicle according to first and fourth embodiments of the present invention.

FIG. 1 is a schematic configuration diagram of a vehicle 10 according to the first embodiment of the present invention. The vehicle 10 according to the first embodiment is an engine vehicle having an engine 30 as a power source. As will be described later, the vehicle 10 may be a different type of vehicle other than an engine vehicle. The vehicle 10 includes a power system 20, a hydraulic system 22, and a control system 24.

[A-1-2. Power System 20]

The power system 20 generates power (or a drive torque) for enabling the vehicle 10 to travel. In addition to the engine 30, the power system 20 includes a transmission unit 32, a front shaft 34, front wheels 36l, 36r, transfer gears 38, a propeller shaft 40, a coupling 42, a rear differential 44, a rear shaft 46, and rear wheels 48l, 48r.

Further, the transmission unit 32 (hereinafter also referred to as a "TM unit 32") includes a torque converter 60, a lockup clutch 62, a continuously variable transmission 64, an intermediate gear 66, and a final gear 68. The continuously variable transmission 64 (hereinafter also referred to as a "CVT 64") includes a drive pulley 70, a driven pulley 72, and an endless belt 74 (see also FIG. 3).

Figure 2:
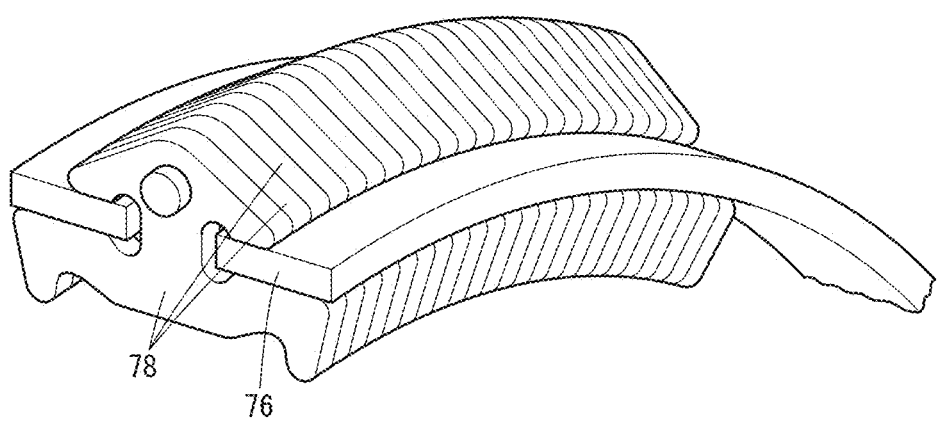
FIG. 2 is a perspective view showing a portion of an endless belt of the first and fourth embodiments.

FIG. 2 is a perspective view showing a portion of the endless belt 74 of the first embodiment. The endless belt 74 is made of metal, and as shown in FIG. 2, includes an endless ring 76 (hereinafter also referred to as a "ring 76"), and a plurality of elements 78 arranged around the ring 76.

As shown in FIG. 1, the transfer gears 38 include an input gear 80, a bevel gear 82, and an output gear 84. The rear differential 44 includes an input gear 90 and an output gear 92.

The coupling 42 of the present embodiment is an electronically controlled type of coupling, which is placed in a connected state when a predetermined condition is satisfied, and is placed in a disconnected state otherwise. As for the predetermined condition referred to herein, for example, a condition can be used in which an operation amount θap of the accelerator pedal (hereinafter also referred to as an "AP operation amount θap") [%] becomes greater than or equal to an operation amount threshold value. Alternatively, the connected state and the disconnected state may be switched responsive to an operation input of a user made with respect to a non-illustrated changeover switch. The coupling 42 may be of a type other than an electronically controlled type (for example, a viscous coupling type).

Moreover, for example, from the standpoint of suppressing vibrations or noises caused by the propeller shaft 40 (or the torque transmitting rotary body), as will be described below, the power system 20 is not limited to the above-described configuration, and other configurations apart therefrom may also be included.

[A-1-3. Hydraulic System 22]

The hydraulic system 22 supplies a hydraulic pressure to the TM unit 32 (in particular, the torque converter 60, the lockup clutch 62, the drive pulley 70, and the driven pulley 72). The hydraulic system 22 includes a hydraulic pump 110, oil passages 112a, 112b, 112c, 112d, and control valves 114a, 114b, 114c, 114d. The hydraulic pump 110 is operated in accordance with the power (or the drive torque) generated by the engine 30. Stated otherwise, the engine 30 is used as a part of a mechanical pump. Alternatively, the hydraulic pump 110 may be constituted by combining the engine 30 and a non-illustrated electric motor. Alternatively, the hydraulic pump 110 may be constituted solely by an electric motor.

[A-1-4. Control System 24]

(A-1-4-1. Outline of Control System 24)

The control system 24 serves to control the power system 20 and the hydraulic system 22. The control system 24 includes a sensor group 120, and an electronic control device 122 (hereinafter referred to as an "ECU 122").

(A-1-4-2. Sensor Group 120)

In the sensor group 120, there are included an accelerator pedal sensor 130, a vehicle velocity sensor 132, an engine frequency sensor 134, and first to fourth oil pressure sensors 136, 138, 140, 142.

The accelerator pedal sensor 130 (hereinafter also referred to as an "AP sensor 130") detects the AP operation amount θap. The vehicle velocity sensor 132 detects the vehicle velocity V [km/h] of the vehicle 10. The engine frequency sensor 134 (drive source frequency sensor) detects a rotational frequency fe (hereinafter also referred to as an "engine rotational frequency fe" or an "engine frequency fe") [Hz] of the engine 30. Moreover, although the units of the engine frequency fe are assumed to be in Hertz (Hz), it is also possible to use units of revolutions per minute (rpm) or the like.

The first oil pressure sensor 136 detects a pressure Ptc (torque converter oil pressure Ptc) [Pa] of the oil supplied to the torque converter 60. The second oil pressure sensor 138 detects a pressure Pdr (drive pulley oil pressure Pdr) [Pa] of the oil supplied to the drive pulley 70. The third oil pressure sensor 140 detects a pressure Pdn (driven pulley oil pressure Pdn) [Pa] of the oil supplied to the driven pulley 72. The fourth oil pressure sensor 142 detects a pressure Plc (lockup clutch oil pressure Plc) [Pa] of the oil supplied to the lockup clutch 62.

(A-1-4-3. ECU 122)

As shown in FIG. 1, the ECU 122 includes as hardware components thereof an input/output unit 160, a computation unit 162, and a storage unit 164. The ECU 122 controls the power system 20 and the hydraulic system 22 on the basis of output values from the respective sensors.

The input/output unit 160 performs input and output between the ECU 122 and the external devices (for example, the AP sensor 130 and the vehicle velocity sensor 132).

The computation unit 162 includes a central processing unit (CPU), and controls the power system 20 and the hydraulic system 22 using programs and data stored in the storage unit 164. The computation unit 162 executes a vibration/noise suppression control for suppressing vibrations or noises that accompany transmission of the drive torque (details thereof will be described later with reference to FIGS. 3 to 6). The computation unit 162 includes an engine control unit 170 and a TM unit control unit 172.

The engine control unit 170 (hereinafter also referred to as an "ENG control unit 170") controls the engine 30 on the basis of output values from the sensor group 120 (for example, the AP sensor 130, the vehicle velocity sensor 132, and the engine frequency sensor 134).

The TM unit control unit 172 controls the TM unit 32 on the basis of output values from the sensor group 120. The TM unit control unit 172 includes a torque converter control unit 180, a continuously variable transmission control unit 182, and a lockup clutch control unit 184.

The torque converter control unit 180 controls the torque converter 60 on the basis of output values from the first oil pressure sensor 136 and the like. The continuously variable transmission control unit 182 (hereinafter also referred to as a "CVT control unit 182") controls the drive pulley 70 and the driven pulley 72 based on output values from the second and third oil pressure sensors 138, 140 and the like, thereby controlling a gear ratio R of the CVT 64 (hereinafter also referred to as a "CVT gear ratio R"). The lockup clutch control unit 184 (hereinafter also referred to as an "LC control unit 184") controls the lockup clutch 62 on the basis of output values from the fourth oil pressure sensor 142 and the like.

The storage unit 164 stores programs and data used by the computation unit 162, and includes a random access memory (hereinafter referred to as a "RAM"). As the RAM, a volatile memory such as a register or the like, and a nonvolatile memory such as a flash memory or the like can be used. Further, in addition to the RAM, the storage unit 164 may include a read-only memory (hereinafter referred to as a "ROM"). As will be described later, the storage unit 164 stores a triple overlapping determination map 330 (see FIG. 5).

A-2. Vibration/Noise Suppression Control of the First Embodiment

[A-2-1. Outline of Vibration/Noise Suppression Control]

As described above, according to the first embodiment, a vibration/noise suppression control is executed. The vibration/noise suppression control is a control to suppress vibrations or noises accompanying transmission of the drive torque. In the vibration/noise suppression control of the first embodiment, the control subject is the ECU 122 (and in particular, the CVT control unit 182), and the control object (the object to be controlled) is the continuously variable transmission 64. The phenomena of "vibrations or noises accompanying transmission of the drive torque" as referred to herein occur in the triple overlapping state described below.

[A-2-2. Triple Overlapping State]

The triple overlapping state is a state in which the rotational frequency fe or the harmonic frequency fh of the engine 30, the resonant frequency frp of the propeller shaft 40, and the resonant frequency frb of the endless belt 74 coincide with or closely approximate each other. The harmonic frequency fh is a harmonic frequency of the engine frequency fe. The resonant frequency frp of the propeller shaft 40 is also referred to as a "propeller shaft resonant frequency frp" or simply a "resonant frequency frp". The resonant frequency frb of the endless belt 74 is also referred to as a "belt resonant frequency frb" or simply a "resonant frequency frb".

According to the first embodiment, the state in which the secondary harmonic frequency fh of the engine frequency fe, the propeller shaft resonant frequency frp, and the belt resonant frequency frb coincide with or closely approximate each other is regarded as the triple overlapping state. The present inventors have discovered that vibrations and noises are generated due to a tooth surface separation occurring between the propeller shaft 40 and the transfer gears 38 and the like in the triple overlapping state. Thus, in the case that the triple overlapping state occurs (and/or in the case that the triple overlapping state is about to occur), the belt resonant frequency frb is controlled in a manner so as to suppress the triple overlapping state.

As confirmed by the present inventors, there are three types of resonant frequencies in the propeller shaft resonant frequency frp. More specifically, the three types are the propeller shaft resonant frequencies frp1, frp2, frp3 (hereinafter also referred to as "resonant frequencies frp1, frp2, frp3") as will be described later with reference to FIG. 5. Therefore, in each of the resonant frequencies frp1, frp2, frp3, the belt resonant frequency frb is controlled in a manner so as to suppress the triple overlapping state.

The causes that correspond respectively to the propeller shaft resonant frequencies frp1, frp2, frp3 have not been identified completely. However, it is conjectured that the resonant frequencies frp1, frp2 are resonant frequencies in a torsional direction of the propeller shaft 40, and the resonant frequency frp3 is a resonant frequency in a bending direction of the propeller shaft 40. Further, the resonant frequency frp1 corresponds to a case in which the lockup clutch 62 is in a connected state, and the resonant frequency frp2 corresponds to a case in which the lockup clutch 62 is in a disconnected state. Stated otherwise, it should be understood that the resonant frequencies frp1, frp2 are distinguished by differences in the inertial mass connected to the propeller shaft 40.

Moreover, occurrence of the triple overlapping state is confirmed in the case that the vehicle 10 is in a two-wheel drive state (stated otherwise, in the case that the coupling 42 is in the disconnected state), and occurrence of the triple overlapping state is not confirmed in the case that the vehicle 10 is in the four-wheel drive state (stated otherwise, in the case that the coupling 42 is in the connected state).

Figure 3:
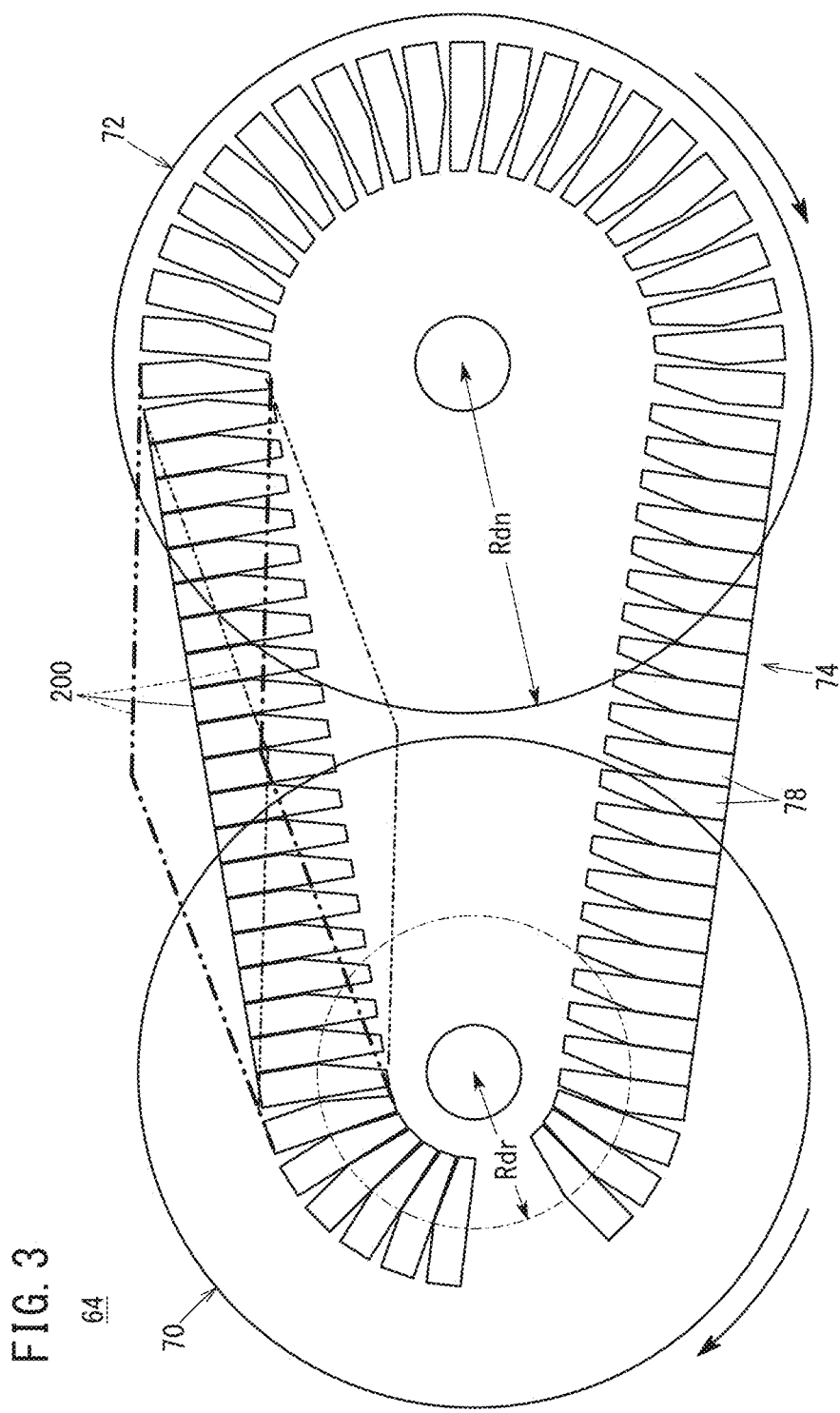
FIG. 3 is a view showing a manner in which a chord of the endless belt is displaced or vibrated in the first and fourth embodiments.

FIG. 3 is a view for explaining the vibration of the endless belt 74 or the resonant frequency frb in the first embodiment, and illustrates the manner in which a chord 200 of the endless belt 74 is displaced or vibrated in the first embodiment. The chord 200 as referred to herein includes the ring 76 (see FIG. 2) and the elements 78. The position of the chord 200 at a certain point in time t1 is indicated by the thick two-dot dashed line, and the position of the chord 200 at a subsequent point in time t2 is indicated by the thin two-dot dashed line. The belt resonant frequency frb of the first embodiment can be thought of as a resonant frequency of the chord 200.

The belt resonant frequency frb is changed by a force acting on the chord 200 in the direction of movement of the belt 74 as indicated by the arrows in FIG. 3. More specifically, the belt resonant frequency frb changes depending on a tension Ft exerted on the ring 76 that makes up the chord 200, and a pressing force Fp exerted between the elements 78 that make up the chord 200.

Figure 4:
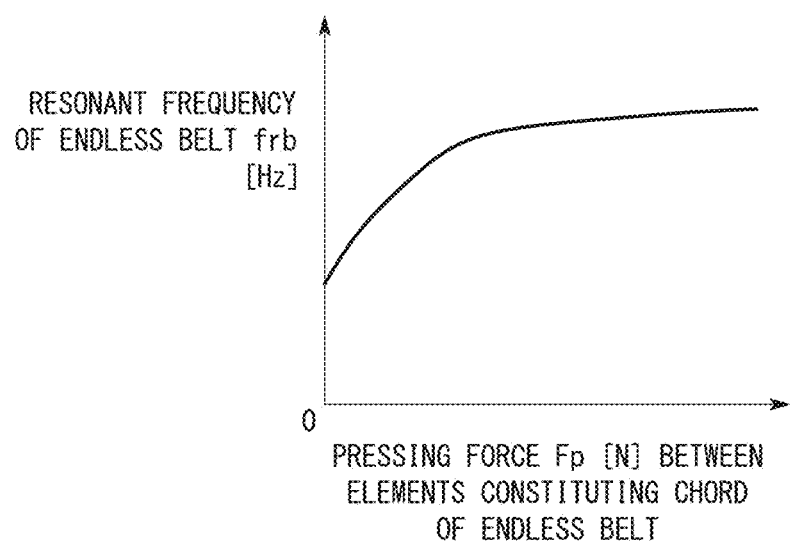
FIG. 4 is a diagram showing a relationship between a pressing force exerted between elements that constitute the chord of the endless belt, and a belt resonant frequency in the first and fourth embodiments.

FIG. 4 is a diagram showing a relationship between the pressing force Fp exerted between the elements 78 of the chord 200 of the endless belt 74, and the belt resonant frequency frb in the first embodiment. As shown in FIG. 4, when the pressing force Fp increases, the belt resonant frequency frb also increases. Although not shown, the tension Ft behaves in the same manner, and the belt resonant frequency frb changes in accordance with changes in the tension Ft.

Figure 5:
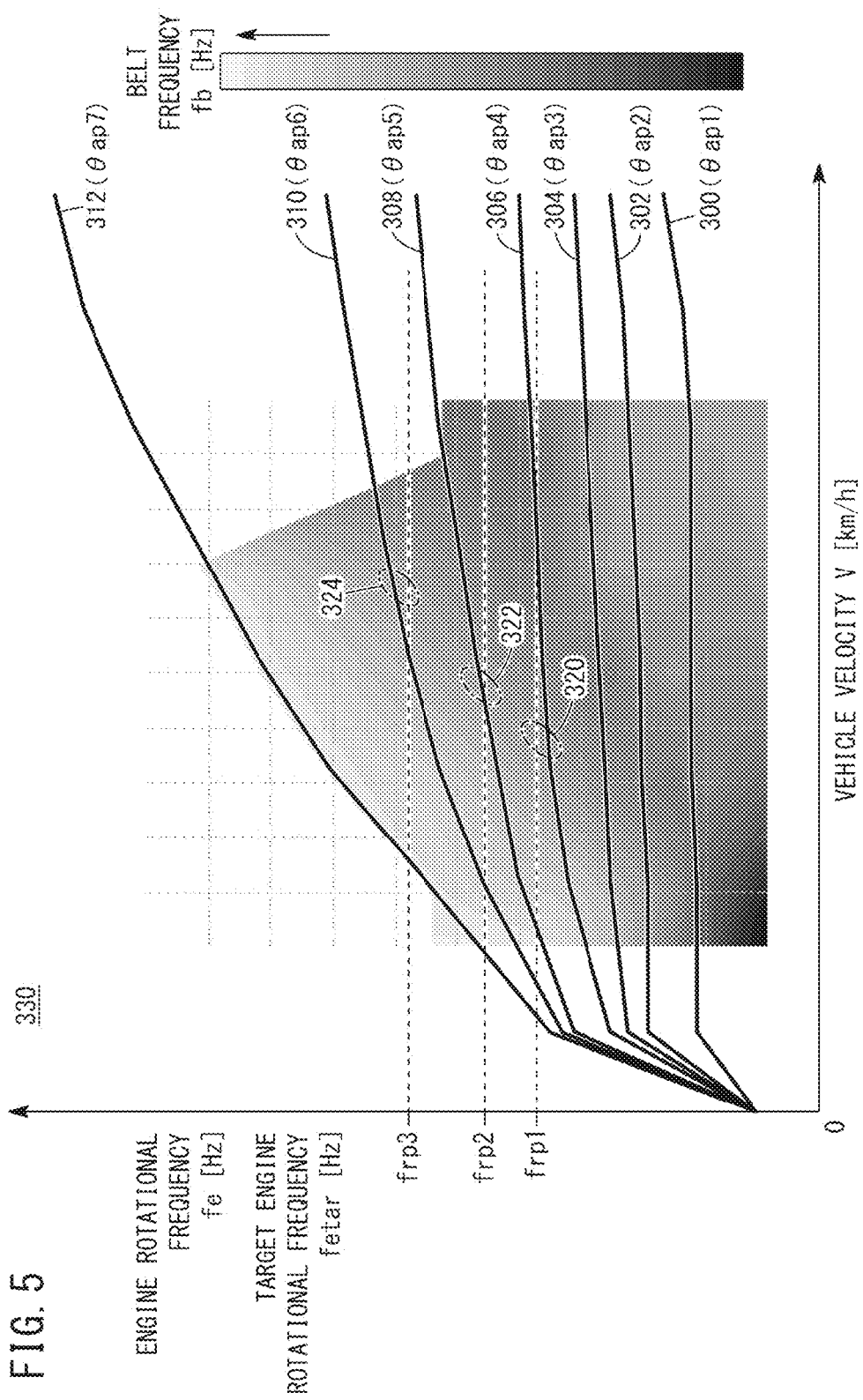
FIG. 5 is a diagram showing a relationship between control characteristics of an engine, and a triple overlapping state in the first embodiment.

FIG. 5 is a diagram showing a relationship between the control characteristics of the engine 30, and the triple overlapping state in the first embodiment. In FIG. 5, the vehicle velocity V is shown on the horizontal axis, whereas the engine rotational frequency fe and a target engine rotational frequency fetar (hereinafter also referred to as a "target engine frequency fetar") are shown on the vertical axis. Further, a frequency fb (hereinafter also referred to as a "belt frequency fb") of the endless belt 74 corresponding to the vehicle velocity V and the engine frequency fe is represented in grayscale. Moreover, it should be kept in mind that, in FIG. 5, grayscale data of the belt frequency fb is shown only in a portion thereof, and in portions apart therefrom, such data is omitted, or pertains to a range in which, during use, the belt frequency fb cannot be obtained.

The lines 300, 302, 304, 306, 308, 310, and 312 in FIG. 5 are lines showing relationships between the vehicle velocity V and the target engine frequency fetar for each of the accelerator operation amounts θap. More specifically, the lines 300, 302, 304, 306, 308, 310, and 312 correspond respectively to the accelerator operation amounts θap1, θap2, θap3, θap4, θap5, θap6, and θap7. The accelerator operation amounts θap1 to θap7 satisfy the relationship, θap1<θap2<θap3<θap4<θap5<θap6<θap7. Hereinafter, the lines 300, 302, 304, 306, 308, 310, and 312 may also be referred to as "characteristics 300, 302, 304, 306, 308, 310, and 312".

The regions 320, 322, 324 in FIG. 5 are regions in which the triple overlapping state occurs, and hereinafter, are also referred to as triple overlapping regions 320, 322, 324. As noted previously, the triple overlapping state of the first embodiment is a state in which the secondary harmonic frequency fh of the engine frequency fe, the propeller shaft resonant frequencies frp (frp1, frp2, frp3), and the belt resonant frequency frb coincide with or closely approximate each other. Therefore, it should be noted that the engine frequencies fe pertaining to the triple overlapping state are one half the values of the frequencies belonging to the triple overlapping regions 320, 322, 324.

According to the first embodiment, when a value that is two times the engine frequency fe lies within the regions 320, 322, 324, the belt resonant frequency frb is changed. Consequently, the triple overlapping state is suppressed.

According to the first embodiment, relationships between the regions 320, 322, 324, and combinations of the vehicle velocities V represented by the characteristics 300, 302, 304, 306, 308, 310, 312 and the target engine frequency fetar, are stored in the form of a triple overlapping determination map 330 (hereinafter, also referred to as a "map 330").

[A-2-3. Specific Content of Vibration/Noise Suppression Control]

Figure 6:
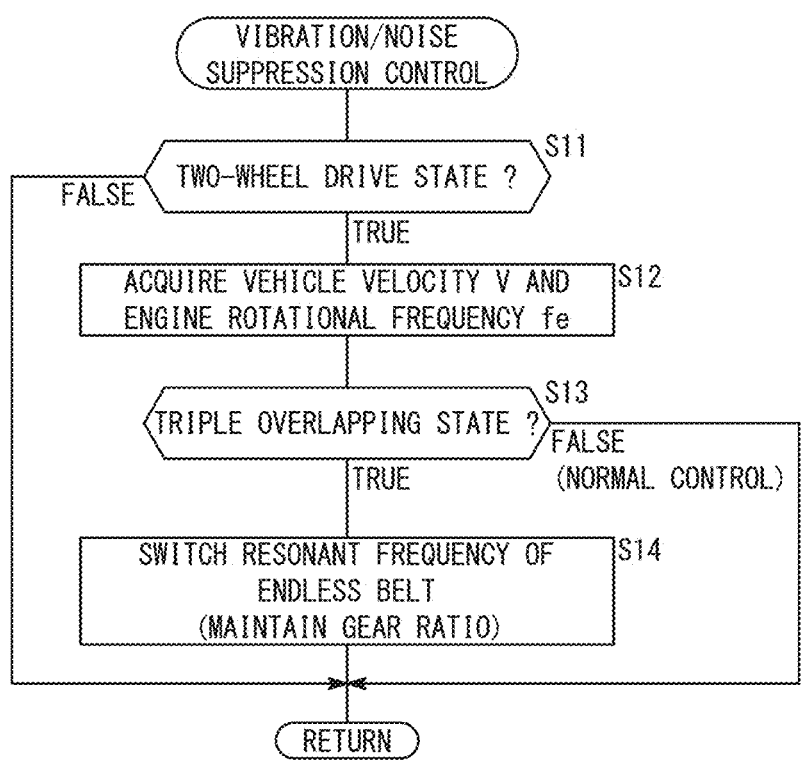
FIG. 6 is a flowchart of a vibration/noise suppression control according to the first embodiment.

FIG. 6 is a flowchart of the vibration/noise suppression control according to the first embodiment. In step S11, the ECU 122 determines whether or not the vehicle 10 has been placed in the two-wheel drive state (or in other words, whether or not the coupling 42 has been placed in the disconnected state). In the case of the two-wheel drive state (step S11: TRUE), then in step S12, the ECU 122 acquires the vehicle velocity V from the vehicle velocity sensor 132, and the rotational frequency fe from the engine frequency sensor 134. In the case of not being in the two-wheel drive state (step S11: FALSE), then the coupling 42 is in the connected state, and the vehicle 10 is in the four-wheel drive state. In this case, the current process is terminated, and after the elapse of a predetermined time period, the process returns to step S11.

In step S13, the ECU 122 determines whether or not the triple overlapping state is occurring. More specifically, the ECU 122 determines whether or not the coordinates specified by the vehicle velocity V and the engine frequency fe belong to any one of the triple overlapping regions 320, 322, 324 of FIG. 5. In implementation thereof, a range of a combination of the vehicle velocity V and the engine frequency fe belonging to any one of the triple overlapping regions 320, 322, 324 is set beforehand, and when the combination of the vehicle velocity V and the engine frequency fe lies within such a range, the ECU 122 can determine the existence of the triple overlapping state. In the case of the triple overlapping state (step S13: TRUE), the process proceeds to step S14.

In step S14, the ECU 122 controls the continuously variable transmission 64 to thereby switch the resonant frequency frb of the endless belt 74. For example, while maintaining the gear ratio R of the continuously variable transmission 64, the ECU 122 changes the force Fb that acts on the endless belt 74 in the direction of movement of the endless belt 74. More specifically, the tension Ft of the endless ring 76 and the pressing force Fp between the elements 78 are changed.

For example, the ECU 122 increases the hydraulic pressure applied respectively to the drive pulley 70 and the driven pulley 72, and thereby increases the radii Rdr, Rdn (see FIG. 3) of the belt 74 respectively in the drive pulley 70 and the driven pulley 72. Consequently, while the gear ratio R is maintained as is, the force Fb of the endless belt 74 can be increased. Alternatively, the ECU 122 may decrease the hydraulic pressures applied respectively to the drive pulley 70 and the driven pulley 72, and thereby reduce the belt radii Rdr, Rdn of the drive pulley 70 and the driven pulley 72. Alternatively, the gear ratio R may be increased or decreased.

Returning to step S13 of FIG. 6, in the case that the triple overlapping state does not exist (step S13: FALSE), the triple overlapping state is not occurring. In this case, the process of the current cycle is terminated without carrying out step S14. In this case, the ECU 122 controls the CVT 64 in the usual way (on the basis of the vehicle velocity V, the engine frequency fe, the target engine frequency fetar, etc.).

A-3. Advantages and Effects of the First Embodiment

As described above, according to the first embodiment, the belt resonant frequency frb is controlled in a manner so as to suppress a triple overlapping state in which the second harmonic frequency fh of the engine frequency fe (drive source frequency), the propeller shaft resonant frequency frp (rotary body resonant frequency), and the belt resonant frequency frb coincide with or closely approximate each other (see FIG. 6). Consequently, it is possible to suppress the occurrence of vibrations or noises due to the triple overlapping state.

In the first embodiment, when the triple overlapping state is detected or predicted (step S13 of FIG. 6: TRUE), the ECU 122 (control device) temporarily changes the tension Ft of the endless ring 76 and/or the pressing force Fp of the elements 78 (the force acting on the endless belt 74 in the direction of movement of the endless belt 74), and thereby temporarily changes the belt resonant frequency frb (step S14). In accordance with this feature, it is possible to more reliably suppress the triple overlapping state.

In the first embodiment, the vehicle 10 is equipped with the vehicle velocity sensor 132 that acquires the vehicle velocity V (see FIG. 1). Further, the ECU 122 (control device) includes the storage unit 164 (see FIG. 1) which stores the map 330 (see FIG. 5) defining the relationship between the triple overlapping state, and the combination of the engine frequency fe (drive source frequency) and the vehicle velocity V. Furthermore, the ECU 122 detects or predicts the triple overlapping state on the basis of the combination of the engine frequency fe and the vehicle velocity V (step S13 of FIG. 6). In accordance with this feature, it is possible to more reliably suppress the triple overlapping state.

In the first embodiment, the vehicle 10 is capable of switching between a four-wheel drive state and a two-wheel drive state (refer to the coupling 42 in FIG. 1). Further, the ECU 122 (control device) executes switching of the belt resonant frequency frb in order to suppress the triple overlapping state, on the condition that the vehicle 10 is in the two-wheel drive state (step S11 of FIG. 6: TRUE). In accordance with this feature, switching of the belt resonant frequency frb in order to suppress the triple overlapping state is performed only in the two-wheel drive state, and is not performed in the four-wheel drive state. Consequently, in the case that vibration of the propeller shaft 40 is likely to occur when the two-wheel drive state is in effect, it is possible to carry out switching of the belt resonant frequency frb in an appropriate situation.

B. Second Embodiment

B-1. Configuration of Second Embodiment (Differences from the First Embodiment)

Figure 7:
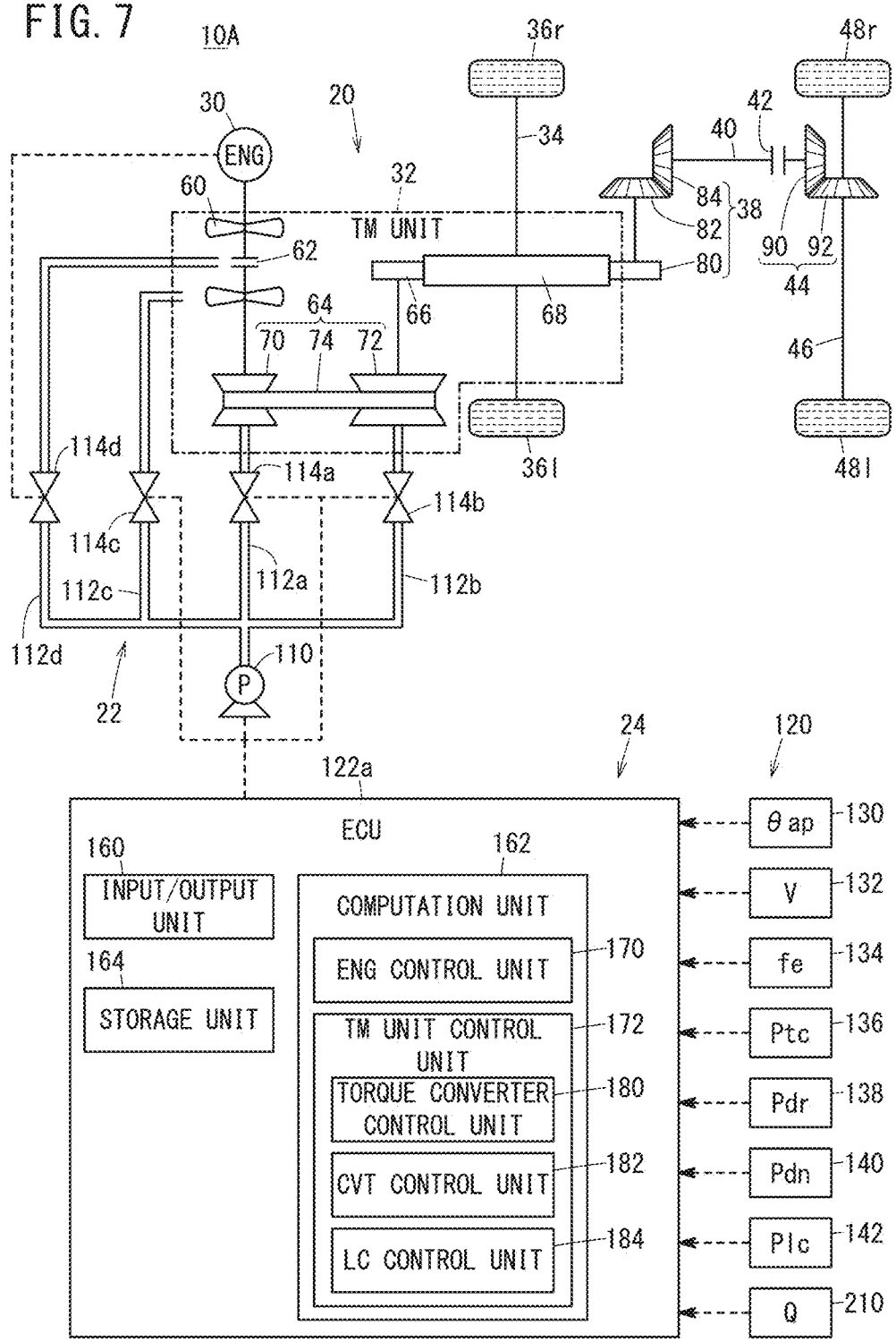
FIG. 7 is a schematic configuration diagram of a vehicle according to second and fifth embodiments of the present invention.

FIG. 7 is a schematic configuration diagram of a vehicle 10A according to the second embodiment of the present invention. The vehicle 10A of the second embodiment basically has the same constituent elements as the vehicle 10 of the first embodiment. In the following description, the same constituent elements are designated by the same or similar reference numerals, and detailed description of such features is omitted.

The sensor group 120 of the second embodiment includes a variation amount sensor 210. The variation amount sensor 210 detects a variation amount Q (hereinafter also referred to as a "propeller shaft variation amount Q") of the propeller shaft 40. The variation amount Q (rotational body variation amount) referred to herein, for example, is a displacement speed [rad/sec] of the propeller shaft 40 in a circumferential direction of the propeller shaft 40. Therefore, the variation amount sensor 210 is configured as a combination of a position sensor (for example, a Hall element) that detects the position of the propeller shaft 40 in the circumferential direction, and a computation device that calculates an amount of change in the position per unit time. Alternatively, the variation amount Q can be, for example, an acceleration [rad/sec/sec] of the propeller shaft 40 in the circumferential direction. In this case, the variation amount sensor 210 can be configured as an acceleration sensor that detects the acceleration of the propeller shaft 40 in the circumferential direction.

An electronic control device 122a (hereinafter referred to as an "ECU 122a") of the second embodiment executes a vibration/noise suppression control to suppress vibrations or noises accompanying transmission of the drive torque. In the vibration/noise suppression control of the second embodiment, the triple overlapping state is determined on the basis of the variation amount Q of the propeller shaft 40.

B-2. Vibration/Noise Suppression Control of the Second Embodiment

As discussed above, in the vibration/noise suppression control of the second embodiment, the triple overlapping state is determined on the basis of the variation amount Q of the propeller shaft 40. Further, in the vibration/noise suppression control of the second embodiment, in the case of the triple overlapping state, in addition to switching the belt resonant frequency frb, a rate of engagement Rc of the lockup clutch 62 is switched. The rate of engagement Rc is defined as a quotient which is obtained by dividing the rotational frequency on the output side of the lockup clutch 62 by the rotational frequency on the input side of the lockup clutch 62, or as a percentage of the quotient.

Figure 8:
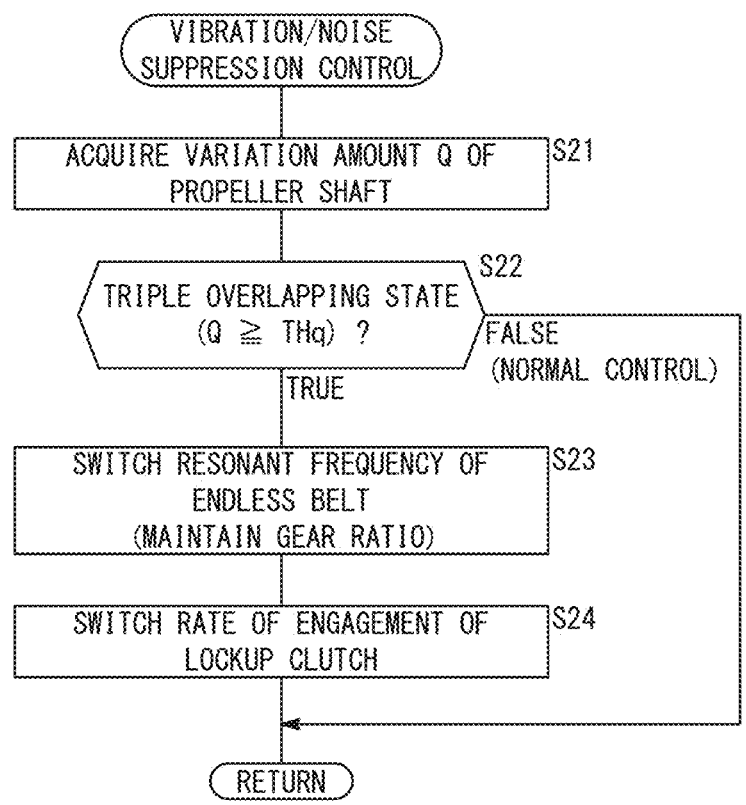
FIG. 8 is a flowchart of a vibration/noise suppression control according to the second embodiment.

FIG. 8 is a flowchart of a vibration/noise suppression control according to the second embodiment. In step S21, the ECU 122 acquires the variation amount Q from the variation amount sensor 210. In step S22, the ECU 122 determines whether or not the triple overlapping state is occurring. More specifically, the ECU 122 determines whether or not the variation amount Q is greater than or equal to a variation amount threshold value THq. The variation amount threshold value THq is a threshold value for determining whether or not the triple overlapping state exists, and is stored beforehand in the storage unit 164. A simulation value or an experimental value can be used for the variation amount threshold value THq.

In the case of the triple overlapping state (step S22: TRUE), then in step S23, the ECU 122 controls the continuously variable transmission 64 to thereby switch the resonant frequency frb of the endless belt 74. The specific method therefore is the same as in step S14 of FIG. 6.

Then, in step S24, the ECU 122 switches the rate of engagement Rc of the lockup clutch 62 via the control valve 114d. For example, if the rate of engagement Rc is 100%, the ECU 122 decreases the rate of engagement Rc by a predetermined value.

Further, if the rate of engagement Rc is less than 100%, the ECU 122 can either increase or decrease the rate of engagement Rc. However, the rate of engagement Rc is changed on the condition that transmission of the drive torque from the drive pulley 70 to the driven pulley 72 via the endless belt 74 is normally performed. Whether or not transmission of the drive torque is being normally performed can be determined on the basis of whether or not the combination of the rotational frequency of the drive pulley 70 and the rotational frequency of the driven pulley 72 is behaving in accordance with the gear ratio R.

Returning to step S22, in the case that the triple overlapping state is not occurring (step S22: FALSE), the process of the current cycle is terminated without carrying out steps S23, S24. In this case, the ECU 122 controls the continuously variable transmission 64 in the usual way (on the basis of the vehicle velocity V, the engine frequency fe, the target engine frequency fetar, etc.).

Moreover, before step S21, the same determination as in step S11 of FIG. 6 can also be performed.

B-3. Advantages and Effects of the Second Embodiment

In accordance with the second embodiment as was described above, in addition to or in place of the effects of the first embodiment, the following advantageous effects can be obtained.

In the second embodiment, the vehicle 10A is equipped with the variation amount sensor 210 (rotary body variation amount sensor) which acquires the variation amount Q of the propeller shaft 40 (torque transmitting rotary body) (see FIG. 7). Further, the ECU 122a (control device) detects or predicts the triple overlapping state on the basis of the variation amount Q (step S22 of FIG. 8). In accordance with this feature, it is possible to detect or predict the triple overlapping state based on the actual state of the propeller shaft 40.

In the second embodiment, the vehicle 10A is equipped with the lockup clutch 62 (see FIG. 7). Further, when the triple overlapping state is detected or predicted (step S22 of FIG. 8: TRUE), the ECU 122a (control device) changes the state of engagement of the lockup clutch 62 (step S24). In accordance with this feature, it is possible to more reliably suppress the triple overlapping state.

C. Third Embodiment

C-1. Configuration of Third Embodiment (Differences from the First Embodiment)

Figure 9:
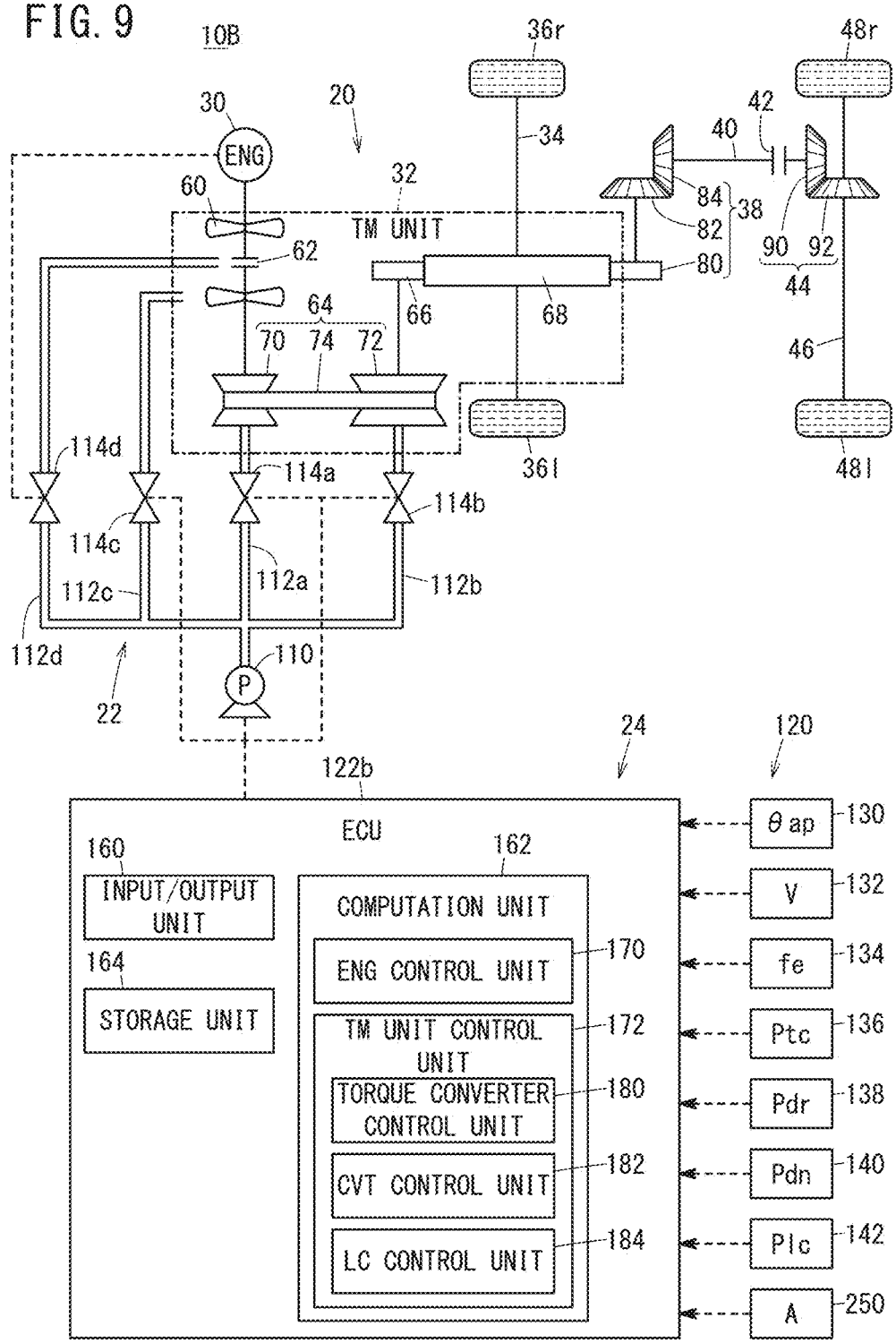
FIG. 9 is a schematic configuration diagram of a vehicle according to third and sixth embodiments of the present invention.

FIG. 9 is a schematic configuration diagram of a vehicle 10B according to the third embodiment of the present invention. The vehicle 10B of the third embodiment basically has the same constituent elements as the vehicle 10 of the first embodiment. In the following description, the same constituent elements are designated by the same or similar reference numerals, and detailed description of such features is omitted.

The sensor group 120 of the third embodiment includes an inclination sensor 250. The inclination sensor 250 detects an angle of inclination A [deg] in the longitudinal direction of the vehicle 10B.

An electronic control device 122b (hereinafter referred to as an "ECU 122b") of the third embodiment executes a vibration/noise suppression control to suppress vibrations or noises accompanying transmission of the drive torque. In the vibration/noise suppression control of the third embodiment, the map 330 (see FIG. 5) is switched on the basis of the angle of inclination A of the vehicle 10B.

C-2. Vibration/Noise Suppression Control of the Third Embodiment

As discussed above, in the vibration/noise suppression control of the third embodiment, the map 330 is switched on the basis of the angle of inclination A of the vehicle 10B. The characteristics shown in FIG. 5 are assumed for a case in which the vehicle 10B is traveling on a flat road. For example, in the case that the vehicle 10B is traveling on an uphill slope, a larger value is required for the engine torque (or the accelerator operation amount θap) in order to realize the target engine frequency fetar. Therefore, in the case that the target engine frequency fetar is associated with the target engine torque in a one-to-one relationship, in the characteristics 300, 302, 304, 306, 308, 310, and 312 shown in FIG. 5, the inclination can be thought to become smaller as a whole on such an uphill slope.

Similarly, in the case that the vehicle 10 is traveling on a downhill slope, a smaller value is required for the engine torque (or the accelerator operation amount θap) in order to realize the target engine frequency fetar. Therefore, in the case that the target engine frequency fetar is associated with the target engine torque in a one-to-one relationship, in the characteristics 300, 302, 304, 306, 308, 310, and 312 shown in FIG. 5, the inclination can be thought to become larger as a whole on such a downhill slope.

Thus, according to the third embodiment, a plurality of maps 330 are stored in the storage unit 164 for each of the angles of inclination A, and the map 330 is switched in accordance with the angle of inclination A detected by the inclination sensor 250.

Figure 10:
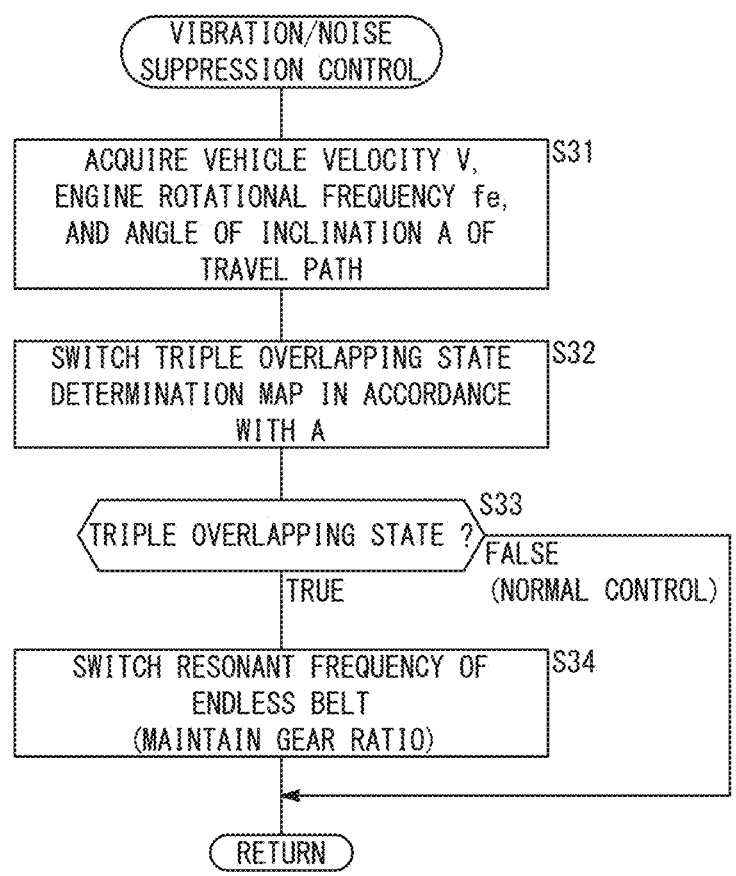
FIG. 10 is a flowchart of a vibration/noise suppression control according to the third embodiment.

FIG. 10 is a flowchart of a vibration/noise suppression control according to the third embodiment. In step S31, the ECU 122b acquires the vehicle velocity V from the vehicle velocity sensor 132, the frequency fe from the engine frequency sensor 134, and the angle of inclination A from the inclination sensor 250.

In step S32, the ECU 122b switches the triple overlapping determination map 330 in accordance with the angle of inclination A. As discussed above, the map 330 selected in the case that the angle of inclination A indicates that the vehicle 10B is traveling on an uphill slope exhibits characteristics in which the inclinations of the characteristics 300, 302, 304, 306, 308, 310, and 312 in FIG. 5 become smaller as a whole, while the positions of the triple overlapping regions 320, 322, 324 are kept as is. Alternatively, the triple overlapping regions 320, 322, 324 may be displaced upward.

Further, the map 330 selected in the case that the angle of inclination A indicates that the vehicle 10B is traveling on a downhill slope exhibits characteristics in which the inclinations of the characteristics 300, 302, 304, 306, 308, 310, and 312 in FIG. 5 become larger as a whole, while the positions of the triple overlapping regions 320, 322, 324 are kept as is. Alternatively, the triple overlapping regions 320, 322, 324 may be displaced downward.

Steps S33 and S34 are the same as steps S13 and S14 of FIG. 6. Moreover, before step S31, the same determination as in step S11 of FIG. 6 can also be performed.

C-3. Advantages and Effects of the Third Embodiment

In accordance with the third embodiment as was described above, in addition to or in place of the effects of the first and second embodiments, the following advantageous effects can be obtained.

According to the third embodiment, the vehicle 10B includes the inclination sensor 250 (inclination determining unit) that determines the angle of inclination A of the travel path of the vehicle 10B (see FIG. 9). Further, the storage unit 164 stores a plurality of the maps 330 in which relationships between the triple overlapping state and the combination of the engine frequency fe (drive source frequency) and the vehicle velocity V are defined, in association with the respective angles of inclination A. Furthermore, the ECU 122b (control device) switches the map 330 in accordance with the angle of inclination A (step S32 of FIG. 10). In accordance with this feature, it is possible to suppress the triple overlapping state in accordance with the inclination of the travel path.

D. Modifications

The present invention is not limited to the above-described first to third embodiments, but it goes without saying that various configurations can be adopted therein based on the descriptive content of the present specification. For example, the following configurations could be adopted.

<D-1. Objects to which the Invention is Applied>

The vehicle 10 of the first embodiment is an engine vehicle (see FIG. 1). However, for example, from the standpoint of controlling the belt resonant frequency frb in a manner so as to suppress the triple overlapping state in which the engine frequency fe or the harmonic frequency fh, the propeller shaft resonant frequency frp, and the belt resonant frequency frb coincide with or closely approximate each other, the present invention is not limited to this feature.

For example, the vehicle 10 may be a hybrid vehicle including a traveling motor (not shown) as a drive source in addition to the engine 30. Alternatively, the vehicle 10 may be an electric vehicle in which traveling power (or a drive torque) is generated solely by a traveling motor without using the engine 30. Among such electric powered vehicles, there may be included electric vehicles in a narrow sense having only a secondary power cell (such as a battery or the like) as a power source for supplying electric power to the traveling motor, and a fuel cell vehicle having both a secondary power cell and a fuel cell as the power source. The same features may also be applied to the second and third embodiments.

<D-2. Engine 30 (Rotary Drive Source)>

The engine 30 according to the first embodiment is arranged on a front side of the vehicle 10 (see FIG. 1).

However, from the standpoint of controlling the belt resonant frequency frb in a manner so as to suppress the triple overlapping state, the present invention is not limited to this feature. For example, the engine 30 can be arranged on a rear side or in the center of the vehicle 10. The same features may also be applied to the second and third embodiments.

<D-3. Lockup Clutch 62>

In the first embodiment, the lockup clutch 62 is provided (see FIG. 1). However, from the standpoint of controlling the engine frequency fe in a manner so as to suppress the triple overlapping state, the present invention is not limited to this feature. For example, the lockup clutch 62 may be omitted. The same features may also be applied to the second and third embodiments.

<D-4. Propeller Shaft 40 (Torque Transmitting Rotary Body)>

According to the first embodiment, the propeller shaft 40 is offered as a torque transmitting rotary body that causes the occurrence of the triple overlapping state (see FIG. 1, for example). However, from the standpoint of controlling the belt resonant frequency frb in a manner so as to suppress the triple overlapping state, the present invention is not limited to this feature. For example, the front shaft 34 or the rear shaft 46 may serve as the torque transmitting rotary body. The same features may also be applied to the second and third embodiments.

<D-5. ECU 122>

In the first embodiment, it was described that the ECU 122 is mounted in the vehicle 10 (see FIG. 1). However, for example, a portion of the ECU 122 may be disposed in a mobile terminal, and the ECU 122 may be configured by connecting the mobile terminal to a network of the vehicle 10. The same features may also be applied to the second and third embodiments.

According to the first embodiment, one ECU 122 controls both the power system 20 and the hydraulic system 22 (see FIG. 1). However, separate ECUs 122 may be provided independently for the power system 20 and the hydraulic system 22. Furthermore, among the components of the power system 20, it is also possible for separate ECUs 122 to be provided independently for the engine 30, the torque converter 60, and the CVT 64. The same features may also be applied to the second and third embodiments.

<D-6. Vibration/Noise Suppression Control>

In the first embodiment, the driving state (two-wheel drive state/four-wheel drive state) of the vehicle 10 is determined (step S11 of FIG. 6). However, for example, assuming that attention is paid to suppressing vibrations or noises in the triple overlapping state, step S11 can be omitted.

According to the first embodiment, a determination is made as to whether or not the triple overlapping state is occurring (step S13 of FIG. 6). Stated otherwise, it is determined whether or not the triple overlapping state was actually detected. However, from the standpoint of suppressing the occurrence of vibrations or noises in the triple overlapping state, the present invention is not limited to this feature. For example, a determination can be made as to whether or not an occurrence of the triple overlapping state is predicted. Such a prediction can be carried out, for example, using the target engine frequency fetar on the basis of the AP operation amount θap and the vehicle velocity V, instead of the engine frequency fe (detected value) as detected by the engine frequency sensor 134. Alternatively, the prediction may be carried out by slightly expanding the triple overlapping regions 320, 322, 324 in FIG. 5. The same features may also be applied to the second and third embodiments.

According to the second embodiment, in the case that the triple overlapping state has occurred (step S22 of FIG. 8: TRUE), the rate of engagement Rc of the lockup clutch 62 is switched (step S24). However, for example, from the standpoint of suppressing the triple overlapping state by switching the state of engagement of the lockup clutch 62, the state of engagement of the lockup clutch 62 can also be switched using an index other than the rate of engagement Rc. For example, in the case that the lockup clutch 62 is in a connected or engaged state when the triple overlapping state is detected or predicted, the lockup clutch 62 may be switched to a released or non-engaged state (rate of engagement Rc=0). Conversely, in the case that the lockup clutch 62 is in the released or non-engaged state when the triple overlapping state is detected or predicted, the lockup clutch 62 may be switched to a connected or engaged state (rate of engagement Rc=a predetermined value other than zero).

According to the second embodiment, in the case that the triple overlapping state has occurred (step S22 of FIG. 8: TRUE), switching of both the belt resonant frequency frb (step S23), and the rate of engagement Rc of the lockup clutch 62 (step S24) is carried out. However, for example, from the standpoint of suppressing the triple overlapping state by switching the state of engagement of the lockup clutch 62, the present invention is not limited to this feature. For example, in the case that switching of the rate of engagement Rc of the lockup clutch 62 is carried out, it is possible not to carry out switching of the belt resonant frequency frb.

According to the third embodiment, the map 330 is switched on the basis of the angle of inclination A of the travel path (step S32 of FIG. 10). However, for example, from the standpoint of switching the map 330 in accordance with changes in the vehicle 10B itself or the surrounding environment, the present invention is not limited to this feature. For example, the map 330 may be switched in accordance with the driving state (two-wheel drive/four-wheel drive) of the vehicle 10B.

Alternatively, the map 330 can be switched in accordance with the state (connected state/disconnected state) of the lockup clutch 62. As noted above, the propeller shaft resonant frequencies frp1, frp2 correspond with the state (connected state/disconnected state) of the lockup clutch 62. Therefore, in the case that the lockup clutch 62 is in the connected or engaged state, it is possible for the characteristic corresponding to the resonant frequency frp1 to be set, and for the resonant frequency frp2 not to be reflected. Similarly, in the case that the lockup clutch 62 is in the disconnected or non-engaged state, it is possible for the characteristic corresponding to the resonant frequency frp2 to be set, and for the resonant frequency frp1 not to be reflected. Alternatively, it is also possible to switch the map 330 on the basis of the variation amount Q of the propeller shaft 40.

According to the third embodiment, the map 330 is switched on the basis of the angle of inclination A of the travel path (step S32 of FIG. 10). However, for example, from the standpoint of switching the map 330 in accordance with the inclination of the travel path, the present invention is not limited to this feature. For example, in the case that a map database of a non-illustrated navigation device includes road inclination information (flat road, uphill slope, downhill slope, etc.), it is also possible to determine the inclination of the travel path using such inclination information.

<D-7. Other Considerations>

In the third embodiment, the vibration/noise suppression control is performed in accordance with the process flow shown in FIG. 10. However, for example, insofar as the effects of the present invention can be obtained, the content of the process flow (the order of the respective steps thereof) is not limited to that shown in FIG. 10. For example, the vehicle velocity V and the engine frequency fe may be obtained after step S32. The same features may also be applied to the first and second embodiments.

In the above-described first to third embodiments, in comparing the numerical values, there are cases in which equal signs are included and cases in which equal signs are not included (refer to step S22 of FIG. 8 and the like). However, for example, assuming there is no special significance to including or excluding such equal signs (or stated otherwise, insofar as the effects of the present invention can be obtained), whether to include or not include equal signs in the comparison of the numerical values can be set arbitrarily.

In that sense, for example, the determination as to whether or not the variation amount Q in step S22 of FIG. 8 is greater than or equal to the variation amount threshold value THq (Q≥THq) may be replaced by a determination as to whether or not the variation amount Q is greater than the variation amount threshold value THq (Q>THq).

E. Fourth Embodiment

E-1. Configuration of Fourth Embodiment

[E-1-1. Overview]

FIG. 1 is a schematic configuration diagram of a vehicle 10 according to the fourth embodiment of the present invention. The vehicle 10 according to the fourth embodiment is an engine vehicle having an engine 30 as a power source. As will be described later, the vehicle 10 may be a different type of vehicle other than an engine vehicle. The vehicle 10 includes a power system 20, a hydraulic system 22, and a control system 24.

[E-1-2. Power System 20]

The power system 20 generates power (or a drive torque) for enabling the vehicle 10 to travel. In addition to the engine 30, the power system 20 includes a transmission unit 32, a front shaft 34, front wheels 36l, 36r, transfer gears 38, a propeller shaft 40, a coupling 42, a rear differential 44, a rear shaft 46, and rear wheels 48l, 48r.

Further, the transmission unit 32 (hereinafter also referred to as a "TM unit 32") includes a torque converter 60, a lockup clutch 62, a continuously variable transmission 64, an intermediate gear 66, and a final gear 68. The continuously variable transmission 64 (hereinafter also referred to as a "CVT 64") includes a drive pulley 70, a driven pulley 72, and an endless belt 74 (see also FIG. 3).

FIG. 2 is a perspective view showing a portion of the endless belt 74 of the fourth embodiment. The endless belt 74 is made of metal, and as shown in FIG. 2, includes an endless ring 76 (hereinafter also referred to as a "ring 76"), and a plurality of elements 78 arranged around the ring 76.

As shown in FIG. 1, the transfer gears 38 include an input gear 80, a bevel gear 82, and an output gear 84. The rear differential 44 includes an input gear 90 and an output gear 92.

The coupling 42 of the present embodiment is an electronically controlled type of coupling, which is placed in a connected state when a predetermined condition is satisfied, and is placed in a disconnected state otherwise. As for the predetermined condition referred to herein, for example, a condition can be used in which an operation amount θap of the accelerator pedal (hereinafter also referred to as an "AP operation amount θap") [%] becomes greater than or equal to an operation amount threshold value. Alternatively, the connected state and the disconnected state may be switched responsive to an operation input of a user made with respect to a non-illustrated changeover switch. The coupling 42 may be of a type other than an electronically controlled type (for example, a viscous coupling type).

Moreover, for example, from the standpoint of suppressing vibrations or noises caused by the propeller shaft 40 (or the torque transmitting rotary body), as will be described below, the power system 20 is not limited to the above-described configuration, and other configurations apart therefrom may also be included.

[E-1-3. Hydraulic System 22]

The hydraulic system 22 supplies a hydraulic pressure to the TM unit 32 (in particular, the torque converter 60, the lockup clutch 62, the drive pulley 70, and the driven pulley 72). The hydraulic system 22 includes a hydraulic pump 110, oil passages 112a, 112b, 112c, 112d, and control valves 114a, 114b, 114c, 114d. The hydraulic pump 110 is operated in accordance with the power (or the drive torque) generated by the engine 30. Stated otherwise, the engine 30 is used as a part of a mechanical pump. Alternatively, the hydraulic pump 110 may be constituted by combining the engine 30 and a non-illustrated electric motor.

Alternatively, the hydraulic pump 110 may be constituted solely by an electric motor.

[E-1-4. Control System 24]

(E-1-4-1. Outline of Control System 24)

The control system 24 serves to control the power system 20 and the hydraulic system 22. The control system 24 includes a sensor group 120, and an electronic control device 122 (hereinafter referred to as an "ECU 122").

(E-1-4-2. Sensor Group 120)

In the sensor group 120, there are included an accelerator pedal sensor 130, a vehicle velocity sensor 132, an engine frequency sensor 134, and first to fourth oil pressure sensors 136, 138, 140, 142.

The accelerator pedal sensor 130 (hereinafter also referred to as an "AP sensor 130") detects the AP operation amount θap. The vehicle velocity sensor 132 detects the vehicle velocity V [km/h] of the vehicle 10. The engine frequency sensor 134 (drive source frequency sensor) detects a rotational frequency fe (hereinafter also referred to as an "engine rotational frequency fe" or an "engine frequency fe") [Hz] of the engine 30. Moreover, although the units of the engine frequency fe are assumed to be in Hertz (Hz), it is also possible to use units of revolutions per minute (rpm) or the like.

The first oil pressure sensor 136 detects a pressure Ptc (torque converter oil pressure Ptc) [Pa] of the oil supplied to the torque converter 60. The second oil pressure sensor 138 detects a pressure Pdr (drive pulley oil pressure Pdr) [Pa] of the oil supplied to the drive pulley 70. The third oil pressure sensor 140 detects a pressure Pdn (driven pulley oil pressure Pdn) [Pa] of the oil supplied to the driven pulley 72. The fourth oil pressure sensor 142 detects a pressure Plc (lockup clutch oil pressure Plc) [Pa] of the oil supplied to the lockup clutch 62.

(E-1-4-3. ECU 122)

As shown in FIG. 1, the ECU 122 includes as hardware components thereof an input/output unit 160, a computation unit 162, and a storage unit 164. The ECU 122 controls the power system 20 and the hydraulic system 22 on the basis of output values from the respective sensors.

The input/output unit 160 performs input and output between the ECU 122 and the external devices (for example, the AP sensor 130 and the vehicle velocity sensor 132).

The computation unit 162 includes a central processing unit (CPU), and controls the power system 20 and the hydraulic system 22 using programs and data stored in the storage unit 164. The computation unit 162 includes an engine control unit 170 and a TM unit control unit 172.

The engine control unit 170 (hereinafter also referred to as an "ENG control unit 170") executes an engine output control for controlling the output of the engine 30 on the basis of output values from the sensor group 120 (for example, the AP sensor 130, the vehicle velocity sensor 132, and the engine frequency sensor 134). Details concerning the engine output control will be described later with reference to FIGS. 3, 4, 11, and 12.

The TM unit control unit 172 controls the TM unit 32 on the basis of output values from the sensor group 120. The TM unit control unit 172 includes a torque converter control unit 180, a continuously variable transmission control unit 182, and a lockup clutch control unit 184.

The torque converter control unit 180 controls the torque converter 60 on the basis of output values from the first oil pressure sensor 136 and the like. The continuously variable transmission control unit 182 (hereinafter also referred to as a "CVT control unit 182") controls the drive pulley 70 and the driven pulley 72 based on output values from the second and third oil pressure sensors 138, 140 and the like, thereby controlling a gear ratio R of the CVT 64 (hereinafter also referred to as a "CVT gear ratio R"). The lockup clutch control unit 184 (hereinafter also referred to as an "LC control unit 184") controls the lockup clutch 62 on the basis of output values from the fourth oil pressure sensor 142 and the like.

The storage unit 164 stores programs and data used by the computation unit 162, and includes a random access memory (hereinafter referred to as a "RAM"). As the RAM, a volatile memory such as a register or the like, and a nonvolatile memory such as a flash memory or the like can be used. Further, in addition to the RAM, the storage unit 164 may include a read-only memory (hereinafter referred to as a "ROM"). As will be described later, the storage unit 164 stores a vehicle velocity-target engine frequency map 330 (see FIG. 11).

E-2. Engine Output Control of the Fourth Embodiment

[E-2-1. Outline of Engine Output Control]

As described above, the ECU 122 (in particular, the engine control unit 170 thereof) executes an engine output control. The engine output control of the fourth embodiment controls the output of the engine 30 so as to suppress vibrations or noises accompanying transmission of the drive torque. The phenomena of "vibrations or noises accompanying transmission of the drive torque" as referred to herein occur in the triple overlapping state described below.

[E-2-2. Triple Overlapping State]

The triple overlapping state is a state in which the rotational frequency fe or the harmonic frequency fh of the engine 30, the resonant frequency frp of the propeller shaft 40, and the resonant frequency frb of the endless belt 74 coincide with or closely approximate each other. The harmonic frequency fh is a harmonic frequency of the engine frequency fe. The resonant frequency frp of the propeller shaft 40 is also referred to as a "propeller shaft resonant frequency frp" or simply a "resonant frequency frp". The resonant frequency frb of the endless belt 74 is also referred to as a "belt resonant frequency frb" or simply a "resonant frequency frb".

According to the fourth embodiment, the state in which the secondary harmonic frequency fh of the engine frequency fe, the propeller shaft resonant frequency frp, and the belt resonant frequency frb coincide with or closely approximate each other is regarded as the triple overlapping state. The present inventors have discovered that vibrations and noises are generated due to a tooth surface separation occurring between the propeller shaft 40 and the transfer gears 38 and the like in the triple overlapping state. Thus, the engine frequency fe is controlled in a manner so as to suppress the triple overlapping state.

As confirmed by the present inventors, there are three types of resonant frequencies in the propeller shaft resonant frequency frp. More specifically, the three types are the propeller shaft resonant frequencies frp11, frp12, frp13 (hereinafter also referred to as "resonant frequencies frp11, frp12, frp13") as will be described later with reference to FIG. 11. Therefore, in each of the resonant frequencies frp11, frp12, frp13, the engine frequency fe is controlled in a manner so as to suppress the triple overlapping state.

The causes that correspond respectively to the propeller shaft resonant frequencies frp11, frp12, frp13 have not been identified completely. However, it is conjectured that the resonant frequencies frp11, frp12 are resonant frequencies in a torsional direction of the propeller shaft 40, and the resonant frequency frp13 is a resonant frequency in a bending direction of the propeller shaft 40. Further, the resonant frequency frp11 corresponds to a case in which the lockup clutch 62 is in a connected state, and the resonant frequency frp12 corresponds to a case in which the lockup clutch 62 is in a disconnected state. Stated otherwise, it should be understood that the resonant frequencies frp11, frp12 are distinguished by differences in the inertial mass connected to the propeller shaft 40.

Moreover, occurrence of the triple overlapping state is confirmed in the case that the vehicle 10 is in a two-wheel drive state (stated otherwise, in the case that the coupling 42 is in the disconnected state), and occurrence of the triple overlapping state is not confirmed in the case that the vehicle 10 is in the four-wheel drive state (stated otherwise, in the case that the coupling 42 is in the connected state).

FIG. 3 is a view for explaining the vibration of the endless belt 74 or the resonant frequency frb in the fourth embodiment, and illustrates the manner in which a chord 200 of the endless belt 74 is displaced or vibrated in the fourth embodiment. The chord 200 as referred to herein includes the ring 76 (see FIG. 2) and the elements 78. The position of the chord 200 at a certain point in time t1 is indicated by the thick two-dot dashed line, and the position of the chord 200 at a subsequent point in time t2 is indicated by the thin two-dot dashed line. The belt resonant frequency frb of the fourth embodiment can be thought of as a resonant frequency of the chord 200.

The belt resonant frequency frb is changed by a force acting on the chord 200 in the direction of movement of the belt 74 as indicated by the arrows in FIG. 3. More specifically, the belt resonant frequency frb changes depending on a tension Ft exerted on the ring 76 that makes up the chord 200, and a pressing force Fp exerted between the elements 78 that make up the chord 200. Moreover, the value Rdr in FIG. 3 is the radius of the belt 74 in the drive pulley 70, and the value Rdn is the radius of the belt 74 in the driven pulley 72.

FIG. 4 is a diagram showing a relationship between the pressing force Fp exerted between the elements 78 of the chord 200 of the endless belt 74, and the belt resonant frequency frb in the fourth embodiment. As shown in FIG. 4, when the pressing force Fp increases, the belt resonant frequency frb also increases. Although not shown, the tension Ft behaves in the same manner, and the belt resonant frequency frb changes in accordance with changes in the tension Ft.

Figure 11:
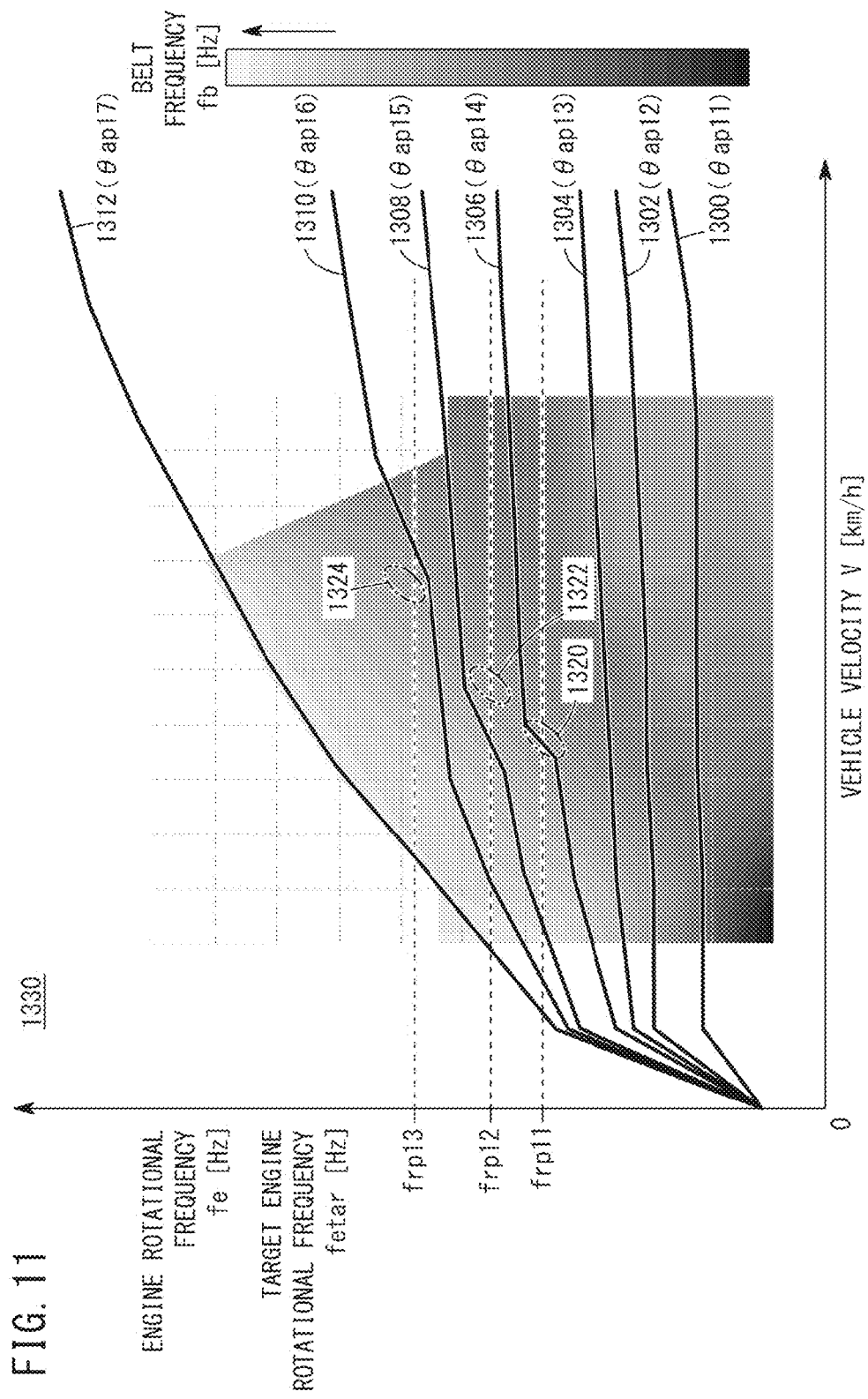
FIG. 11 is a diagram showing a relationship between control characteristics of an engine, and a triple overlapping state in the fourth embodiment.

FIG. 11 is a diagram showing a relationship between the control characteristics of the engine 30, and the triple overlapping state in the fourth embodiment. In FIG. 11, the vehicle velocity V is shown on the horizontal axis, whereas the engine rotational frequency fe and a target engine rotational frequency fetar (hereinafter also referred to as a "target engine frequency fetar") are shown on the vertical axis. Further, a frequency fb (hereinafter also referred to as a "belt frequency fb") of the endless belt 74 corresponding to the vehicle velocity V and the engine frequency fe is represented in grayscale. Moreover, it should be kept in mind that, in FIG. 11, grayscale data of the belt frequency fb is shown only in a portion thereof, and in portions apart therefrom, such data is omitted, or pertains to a range in which, during use, the belt frequency fb cannot be obtained.

The lines 1300, 1302, 1304, 1306, 1308, 1310, and 1312 in FIG. 11 are lines showing relationships between the vehicle velocity V and the target engine frequency fetar for each of the accelerator operation amounts θap. More specifically, the lines 1300, 1302, 1304, 1306, 1308, 1310, and 1312 correspond respectively to the accelerator operation amounts θap11, θap12, θap13, θap14, θap15, θap16, and θap17. The accelerator operation amounts θap11 to θap17 satisfy the relationship, θap11<θap12<θap13<θap14<θap15<θap16<θap17. Hereinafter, the lines 1300, 1302, 1304, 1306, 1308, 1310, and 1312 may also be referred to as "characteristics 1300, 1302, 1304, 1306, 1308, 1310, and 1312".

The regions 1320, 1322, 1324 in FIG. 11 are regions in which the triple overlapping state occurs, and hereinafter, are also referred to as triple overlapping regions 1320, 1322, 1324. As noted previously, the triple overlapping state of the fourth embodiment is a state in which the secondary harmonic frequency fh of the engine frequency fe, the propeller shaft resonant frequencies frp (frp11, frp12, frp13), and the belt resonant frequency frb coincide with or closely approximate each other. Therefore, it should be noted that the engine frequencies fe pertaining to the triple overlapping state are one half the values of the frequencies belonging to the triple overlapping regions 1320, 1322, 1324.

According to the fourth embodiment, the target engine frequency fetar is set so as to suppress values that are two times the target engine frequency fetar, from falling within the regions 1320, 1322, 1324. For example, in the characteristic 1306, the inclination of the portion included within the region 1320 is increased. Further, in the characteristic 1308, the inclination in front of the region 1322 is increased to thereby avoid the region 1322. Further, in the characteristic 1310, the inclination in front of the region 1324 is reduced to thereby avoid the region 1324. Consequently, by reducing the possibility that the target engine frequency fetar will be included within the regions 1320, 1322, 1324, the triple overlapping state is suppressed.

According to the fourth embodiment, relationships between the target engine frequency fetar, and the vehicle velocities V represented by the characteristics 1300, 1302, 1304, 1306, 1308, 1310, and 1312, are stored in the form of a vehicle velocity-target engine frequency map 1330 (hereinafter, also referred to as a "V-fetar map 1330" or simply a "map 1330"). With the map 1330 of the fourth embodiment, although the existence of the regions 1320, 1322, 1324 can be understood through the characteristics 1300, 1302, 1304, 1306, 1308, 1310, and 1312, it should be kept in mind that the coordinates of the regions 1320, 1322, 1324 themselves are not included therein.

[E-2-3. Specific Content of Engine Output Control]

Figure 12:
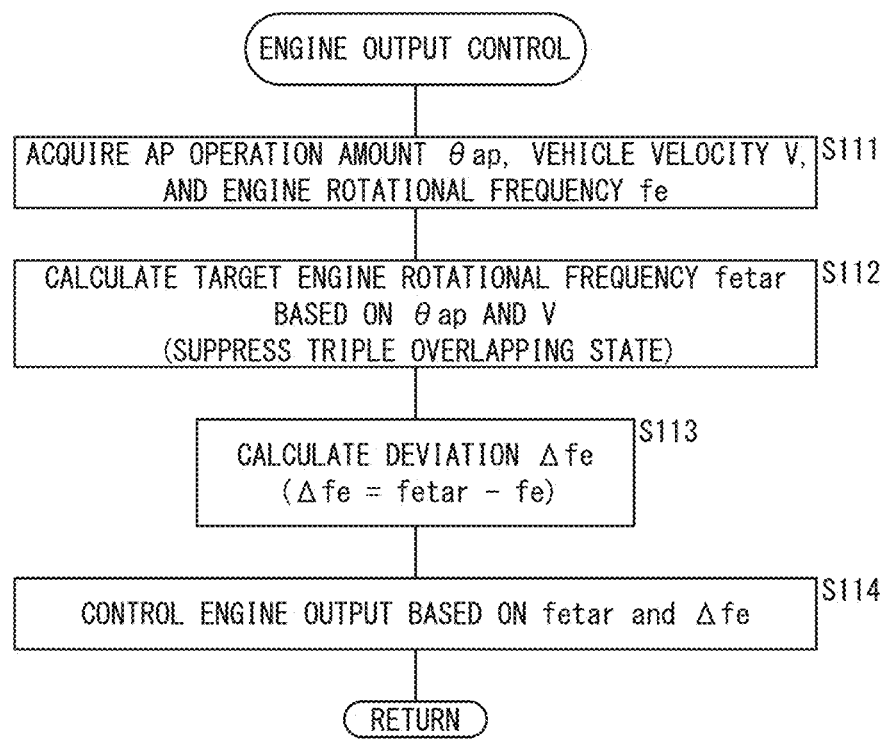
FIG. 12 is a flowchart of an engine output control according to the fourth embodiment.

FIG. 12 is a flowchart of the engine output control according to the fourth embodiment. In step S111, the ECU 122 acquires the AP operation amount θap from the AP sensor 130, the vehicle velocity V from the vehicle velocity sensor 132, and the rotational frequency fe from the engine frequency sensor 134.

In step S112, the ECU 122 calculates the target engine frequency fetar on the basis of the AP operation amount θap and the vehicle velocity V. As noted previously, in the fourth embodiment, the V-fetar map 1330 (see FIG. 11) is used for this purpose. In the map 1330, the target engine frequency fetar is set so as to suppress values that are two times the target engine frequency fetar, from falling within the regions 1320, 1322, 1324.

In step S113, the ECU 122 calculates a deviation Δfe between the target engine frequency fetar and the engine frequency fe (Δfe=fetar−fe). In step S114, the ECU 122 controls the output of the engine 30 on the basis of the target engine frequency fetar and the deviation Δfe. The target engine frequency fetar is used in a feedforward control, and the deviation Δfe is used in a feedback control.

<E-3. Advantages and Effects of the Fourth Embodiment>

As described above, according to the fourth embodiment, the engine frequency fe (drive source frequency) is controlled in a manner so as to suppress a triple overlapping state in which the second harmonic frequency fh of the engine frequency fe (drive source frequency), the propeller shaft resonant frequency frp (rotary body resonant frequency), and the belt resonant frequency frb coincide with or closely approximate each other (see FIGS. 11 and 12). Consequently, it is possible to suppress the occurrence of vibrations or noises due to the triple overlapping state.

In the fourth embodiment, the ECU 122 (control device) includes the storage unit 164 (see FIG. 1) which stores the map 1330 (see FIG. 11) defining the relationship between the engine frequency fe (drive source frequency) and the vehicle velocity V. Further, in the map 1330, the relationship between the engine frequency fe and the vehicle velocity V is defined in a manner so as to suppress entry of the target engine frequency fetar into the regions 1320, 1322, and 1324 (or in other words, suppress the occurrence of the triple overlapping state). In accordance with this feature, the map 1330 is set in advance so as to avoid the state (triple overlapping state) in which the harmonic frequency fh, the propeller shaft resonant frequency frp (rotary body resonant frequency), and the belt resonant frequency frb coincide with or closely approximate each other. Therefore, it is possible to avoid the triple overlapping state, while also reducing the computational load while the vehicle 10 is traveling.

F. Fifth Embodiment

F-1. Configuration of Fifth Embodiment
(Differences from the Fourth Embodiment)

FIG. 7 is a schematic configuration diagram of a vehicle 10A according to the fifth embodiment of the present invention. The vehicle 10A of the fifth embodiment basically has the same constituent elements as the vehicle 10 of the fourth embodiment. In the following description, the same constituent elements are designated by the same or similar reference numerals, and detailed description of such features is omitted.

The sensor group 120 of the fifth embodiment includes a variation amount sensor 210. The variation amount sensor 210 detects a variation amount Q (hereinafter also referred to as a "propeller shaft variation amount Q") of the propeller shaft 40. The variation amount Q (rotational body variation amount) referred to herein, for example, is a displacement speed [rad/sec] of the propeller shaft 40 in a circumferential direction of the propeller shaft 40. Therefore, the variation amount sensor 210 is configured as a combination of a position sensor (for example, a Hall element) that detects the position of the propeller shaft 40 in the circumferential direction, and a computation device that calculates an amount of change in the position per unit time. Alternatively, the variation amount Q can be, for example, an acceleration [rad/sec/sec] of the propeller shaft 40 in the circumferential direction. In this case, the variation amount sensor 210 can be configured as an acceleration sensor that detects the acceleration of the propeller shaft 40 in the circumferential direction.

An engine control unit 170 of an electronic control device 122a (hereinafter referred to as an "ECU 122a") of the fifth embodiment executes an engine output control to control the output of the engine 30 in a manner so as to suppress vibrations or noises accompanying transmission of the drive torque. Further, the LC control unit 184 executes a vibration/noise suppression control for suppressing vibrations or noises that accompany transmission of the drive torque. In the engine output control of the fifth embodiment, the V-fetar map 1330 (see FIG. 11) is switched on the basis of the variation amount Q of the propeller shaft 40. Further, in the vibration/noise suppression control of the fifth embodiment, the triple overlapping state is determined on the basis of the variation amount Q of the propeller shaft 40.

F-2. Engine Output Control of the Fifth Embodiment

Figure 13:
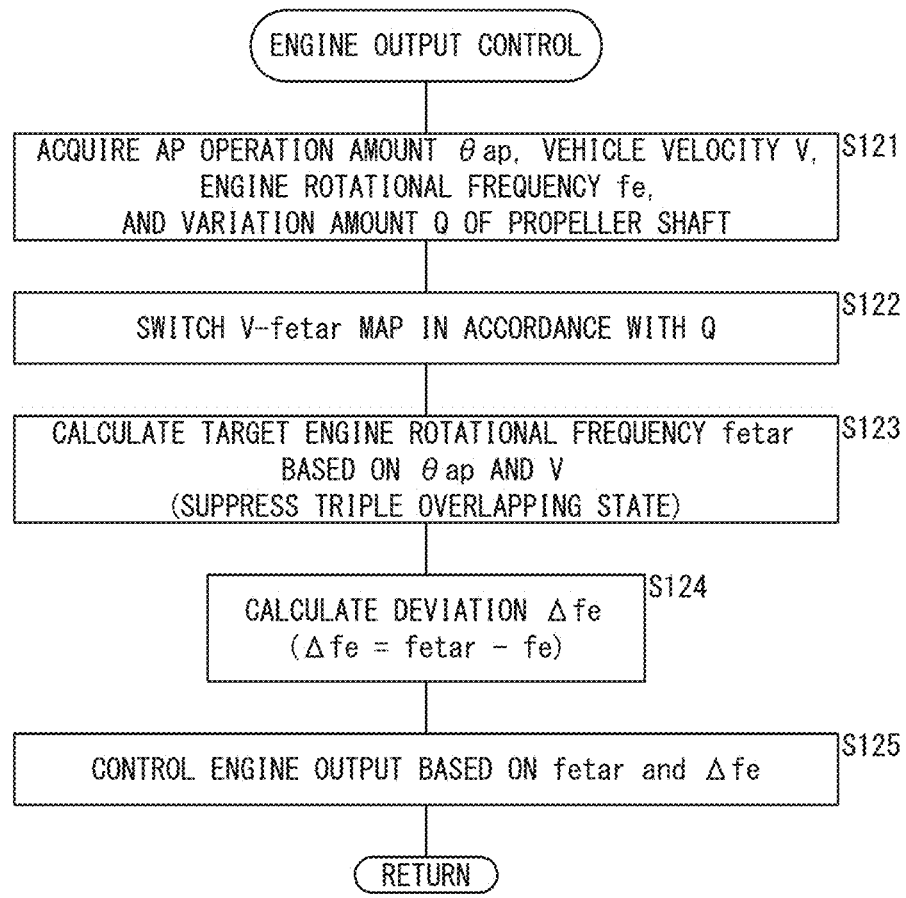
FIG. 13 is a flowchart of an engine output control according to the fifth embodiment.

FIG. 13 is a flowchart of an engine output control according to the fifth embodiment. In step S121, the ECU 122a acquires the AP operation amount θap from the AP sensor 130, the vehicle velocity V from the vehicle velocity sensor 132, the rotational frequency fe from the engine frequency sensor 134, and the variation amount Q of the propeller shaft 40 from the variation amount sensor 210.

In step S122, the ECU 122a switches the V-fetar map 1330 (see FIG. 11) in accordance with the variation amount Q. More specifically, the characteristics in FIG. 11 are assumed for a case in which the variation amount Q is comparatively small (for example, in the case that the variation amount Q is less than or equal to a first variation amount threshold value THq1). In the case that the variation amount Q is comparatively large (for example, in the case that the variation amount Q exceeds the first variation amount threshold value THq1), a map 1330 is switched to a map in which the characteristics 1300, 1302, 1304, 1306, 1308, 1310, and 1312 in FIG. 11 are made smaller or larger overall. Consequently, it becomes easy to escape the triple overlapping state. The number of switchable maps 1330 is, for example, between 2 and 50.

In step S123, the ECU 122a calculates the target engine frequency fetar on the basis of the AP operation amount θap and the vehicle velocity V. At this time, the V-fetar map 1330 (see FIG. 11) that was selected in step S122 is used. Consequently, in the map 1330, the target engine frequency fetar is set so as to further suppress values that are two times the target engine frequency fetar, from falling within the regions 1320, 1322, 1324.

Steps S124 and S125 are the same as steps S113 and S114 of FIG. 12.

F-3. Vibration/Noise Suppression Control of the Fifth Embodiment

As discussed above, the LC control unit 184 of the fifth embodiment executes the vibration/noise suppression control to determine the triple overlapping state on the basis of the variation amount Q of the propeller shaft 40. Further, in the vibration/noise suppression control of the fifth embodiment, in the case of the triple overlapping state, the rate of engagement Rc of the lockup clutch 62 is switched. The rate of engagement Rc is defined as a quotient which is obtained by dividing the rotational frequency on the output side of the lockup clutch 62 by the rotational frequency on the input side of the lockup clutch 62, or as a percentage of the quotient.

Figure 14:
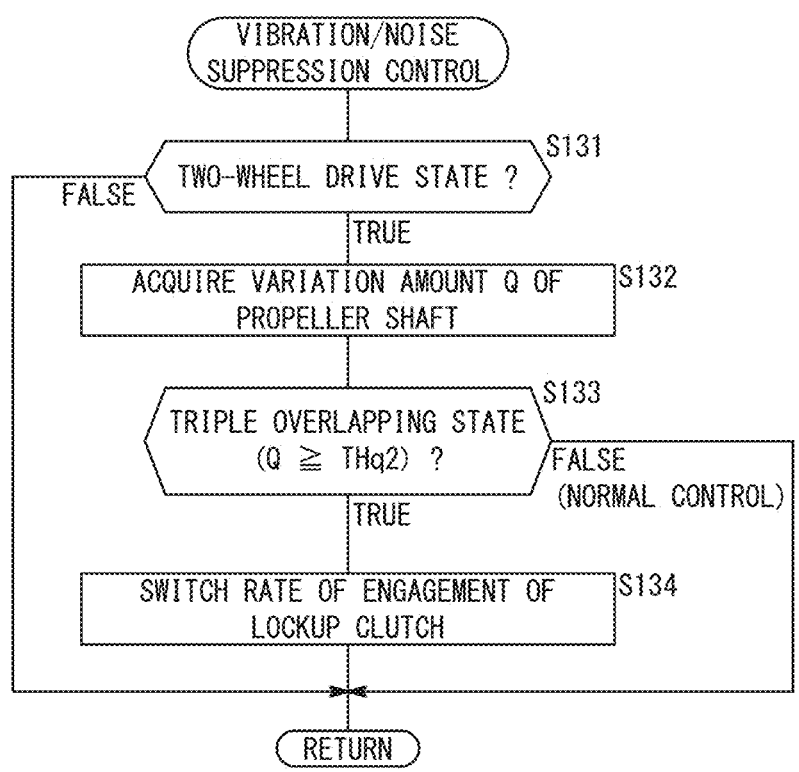
FIG. 14 is a flowchart of a vibration/noise suppression control according to the fifth embodiment.

FIG. 14 is a flowchart of the vibration/noise suppression control according to the fifth embodiment. In step S131, the ECU 122a determines whether or not the vehicle 10A has been placed in the two-wheel drive state (or in other words, whether or not the coupling 42 has been placed in the disconnected state). In the case of the two-wheel drive state (step S131: TRUE), then in step S132, the ECU 122a acquires the variation amount Q from the variation amount sensor 210. In the case of not being in the two-wheel drive state (step S131: FALSE), then the coupling 42 is in the connected state, and the vehicle 10A is in the four-wheel drive state. In this case, the current process is terminated, and after the elapse of a predetermined time period, the process returns to step S131.

In step S133, the ECU 122a determines whether or not the triple overlapping state is occurring. More specifically, the ECU 122a determines whether or not the variation amount Q is greater than or equal to a second variation amount threshold value THq2. The second variation amount threshold value THq2 is a threshold value for determining whether or not the triple overlapping state exists, and is stored in advance in the storage unit 164. A simulation value or an experimental value can be used for the second variation amount threshold value THq2.

In the case of the triple overlapping state (step S133: TRUE), then in step S134, the ECU 122a switches the rate of engagement Rc of the lockup clutch 62 via the control valve 114d. For example, if the rate of engagement Rc is 100%, the ECU 122a decreases the rate of engagement Rc by a predetermined value.

Further, if the rate of engagement Rc is less than 100%, the ECU 122a can either increase or decrease the rate of engagement Rc. However, the rate of engagement Rc is changed on the condition that transmission of the drive torque from the drive pulley 70 to the driven pulley 72 via the endless belt 74 is normally performed. Whether or not transmission of the drive torque is being normally performed can be determined on the basis of whether or not the combination of the rotational frequency of the drive pulley 70 and the rotational frequency of the driven pulley 72 is behaving in accordance with the gear ratio R.

Returning to step S133, in the case that the triple overlapping state is not occurring (step S133: FALSE), the process of the current cycle is terminated without carrying out step S134. In this case, the ECU 122a controls the continuously variable transmission 64 in the usual way (on the basis of the vehicle velocity V, the engine frequency fe, the target engine frequency fetar, etc.).

F-4. Advantages and Effects of the Fifth Embodiment

In accordance with the fifth embodiment as was described above, in addition to or in place of the effects of the fourth embodiment, the following advantageous effects can be obtained.

In the fifth embodiment, the vehicle 10A is equipped with the variation amount sensor 210 (rotary body variation amount sensor) which acquires the variation amount Q of the propeller shaft 40 (torque transmitting rotary body) (see FIG. 7). Further, the storage unit 164 stores a plurality of the maps 1330 in which relationships between the engine frequency fe (drive source frequency) and the vehicle velocity V are defined for the respective variation amounts Q. Furthermore, the ECU 122a (control device) switches the maps 1330 on the basis of the variation Q (S122 of FIG. 13). In accordance with this feature, it is possible to detect or predict the triple overlapping state based on the actual state of the propeller shaft 40.

In the fifth embodiment, the vehicle 10A is equipped with the lockup clutch 62 (see FIG. 7). Further, when the triple overlapping state is detected or predicted (step S133 of FIG. 14: TRUE), the ECU 122a (control device) changes the state of engagement of the lockup clutch 62 (step S134). In accordance with this feature, it is possible to more reliably suppress the triple overlapping state.

In the fifth embodiment, the vehicle 10A is capable of switching between a four-wheel drive state and a two-wheel drive state (refer to the coupling 42 in FIG. 7). Further, the ECU 122a (control device) executes switching of the state of engagement of the lockup clutch 62 (step S134) in order to suppress the triple overlapping state, on the condition that the vehicle 10A is in the two-wheel drive state (step S131 of FIG. 14: TRUE). Consequently, switching of the state of engagement for the purpose of suppressing the triple overlapping state is performed only in the two-wheel drive state, and is not performed in the four-wheel drive state. Consequently, in the case that vibration of the propeller shaft 40 is likely to occur when the two-wheel drive state is in effect, it is possible to carry out switching of the state of engagement in an appropriate situation.

G. Sixth Embodiment

G-1. Configuration of Sixth Embodiment (Differences from the Fourth Embodiment)

FIG. 9 is a schematic configuration diagram of a vehicle 10B according to the sixth embodiment of the present invention. The vehicle 10B of the sixth embodiment basically has the same constituent elements as the vehicle 10 of the fourth embodiment. In the following description, the same constituent elements are designated by the same or similar reference numerals, and detailed description of such features is omitted.

The sensor group 120 of the sixth embodiment includes an inclination sensor 250. The inclination sensor 250 detects an angle of inclination A [deg] in the longitudinal direction of the vehicle 10B.

An engine control unit 170 of an electronic control device 122b (hereinafter referred to as an "ECU 122b") of the sixth embodiment executes an engine output control to control the output of the engine 30 in a manner so as to suppress vibrations or noises accompanying transmission of the drive torque. In the engine output control of the sixth embodiment, the V-fetar map 1330 (see FIG. 11) is switched on the basis of the angle of inclination A of the vehicle 10B.

G-2. Engine Output Control of the Sixth Embodiment

As discussed above, in the engine output control of the sixth embodiment, the map 1330 is switched on the basis of the angle of inclination A of the vehicle 10B. More specifically, the characteristics shown in FIG. 11 are assumed for a case in which the vehicle 10B is traveling on a flat road. For example, in the case that the vehicle 10B is traveling on an uphill slope, a larger value is required for the engine torque (or the accelerator operation amount θap) in order to realize the target engine frequency fetar. Therefore, in the case that the target engine frequency fetar is associated with the target engine torque in a one-to-one relationship, in the characteristics 1300, 1302, 1304, 1306, 1308, 1310, and 1312 shown in FIG. 11, the inclination can be thought to become smaller as a whole on such an uphill slope.

Similarly, in the case that the vehicle 10B is traveling on a downhill slope, a smaller value is required for the engine torque (or the accelerator operation amount θap) in order to realize the target engine frequency fetar. Therefore, in the case that the target engine frequency fetar is associated with the target engine torque in a one-to-one relationship, in the characteristics 1300, 1302, 1304, 1306, 1308, 1310, and 1312 shown in FIG. 11, the inclination can be thought to become larger as a whole on such a downhill slope.

Thus, according to the sixth embodiment, a plurality of maps 1330 are stored in the storage unit 164 for the respective angles of inclination A, and the map 1330 is switched in accordance with the angle of inclination A detected by the inclination sensor 250.

Figure 15:
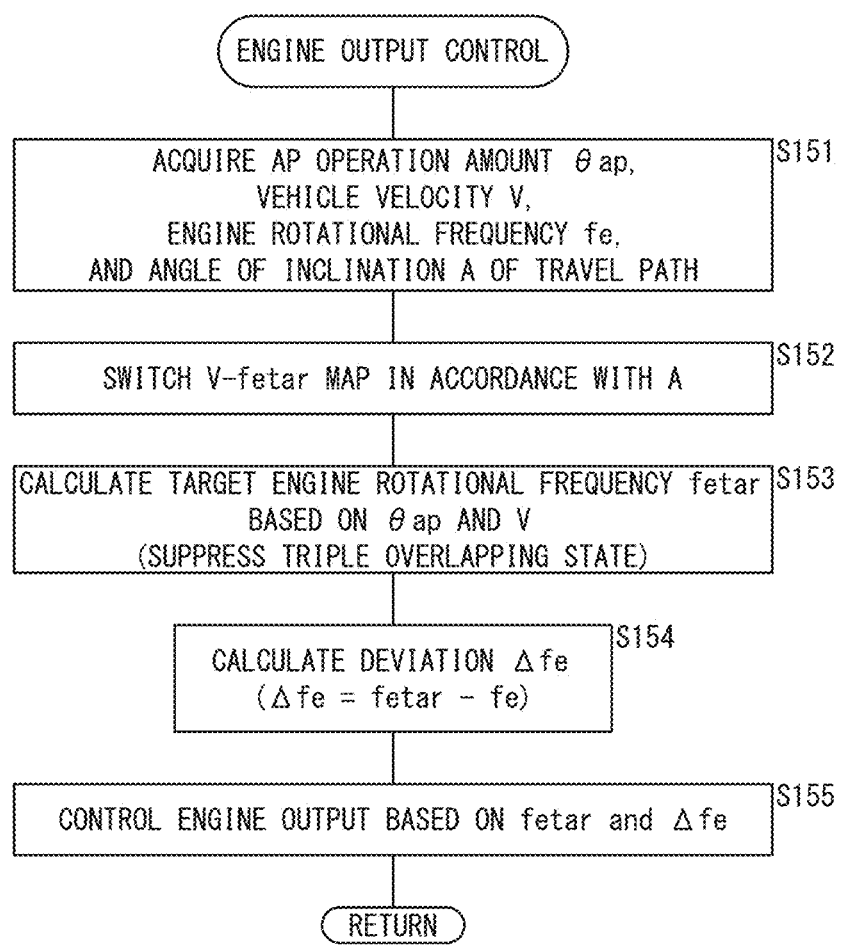
FIG. 15 is a flowchart of an engine output control according to the sixth embodiment.

FIG. 15 is a flowchart of an engine output control according to the sixth embodiment. In step S151, the ECU 122b acquires the AP operation amount θap from the AP sensor 130, the vehicle velocity V from the vehicle velocity sensor 132, the rotational frequency fe from the engine frequency sensor 134, and the angle of inclination A from the inclination sensor 250.

In step S152, the ECU 122b switches the V-fetar map 1330 in accordance with the angle of inclination A. As discussed above, the map 1330 selected in the case that the angle of inclination A indicates that the vehicle 10B is traveling on an uphill slope exhibits characteristics in which the inclinations of the characteristics 1300, 1302, 1304, 1306, 1308, 1310, and 1312 in FIG. 11 become smaller as a whole, while the positions of the triple overlapping regions 1320, 1322, 1324 are kept as is. Alternatively, the triple overlapping regions 1320, 1322, 1324 may be displaced upward.

Further, the map 1330 selected in the case that the angle of inclination A indicates that the vehicle 10B is traveling on a downhill slope exhibits characteristics in which the inclinations of the characteristics 1300, 1302, 1304, 1306, 1308, 1310, and 1312 in FIG. 11 become larger as a whole, while the positions of the triple overlapping regions 1320, 1322, 1324 are kept as is. Alternatively, the triple overlapping regions 1320, 1322, 1324 may be displaced downward.

Steps S153, S154, and S155 are the same as steps S112, S113, and S114 of FIG. 12.

G-3. Advantages and Effects of the Sixth Embodiment

In accordance with the sixth embodiment as was described above, in addition to or in place of the effects of the fourth and fifth embodiments, the following advantageous effects can be obtained.

According to the sixth embodiment, the vehicle 10B includes the inclination sensor 250 (inclination determining unit) that determines the angle of inclination A of the travel path of the vehicle 10B (see FIG. 9). Further, the storage unit 164 stores a plurality of the maps 1330 in which relationships between the engine frequency fe (drive source frequency) and the vehicle velocity V are defined for the respective angles of inclination A. Furthermore, the ECU 122b (control device) switches the map 1330 in accordance with the angle of inclination A (step S152 of FIG. 15). In accordance with this feature, it is possible to suppress the triple overlapping state in accordance with the inclination of the travel path.

H. Modifications

The present invention is not limited to the above-described fourth to sixth embodiments, but it goes without saying that various configurations can be adopted therein based on the descriptive content of the present specification. For example, the following configurations could be adopted.

<H-1. Objects to which the Invention is Applied>

The vehicle 10 of the fourth embodiment is an engine vehicle (see FIG. 1). However, for example, from the standpoint of controlling the engine frequency fe in a manner so as to suppress a triple overlapping state in which the engine frequency fe or the harmonic frequency fh, the propeller shaft resonant frequency frp, and the belt resonant frequency frb coincide with or closely approximate each other, the present invention is not limited to this feature.

For example, the vehicle 10 may be a hybrid vehicle including a traveling motor (not shown) as a drive source in addition to the engine 30. Alternatively, the vehicle 10 may be an electric vehicle in which traveling power (or a drive torque) is generated solely by a traveling motor without using the engine 30. Among such electric powered vehicles, there may be included electric vehicles in a narrow sense having only a secondary power cell (such as a battery or the like) as a power source for supplying electric power to the traveling motor, and a fuel cell vehicle having both a secondary power cell and a fuel cell as the power source. The same features may also be applied to the fifth and sixth embodiments.

<H-2. Engine 30 (Rotary Drive Source)>

The engine 30 according to the fourth embodiment is arranged on a front side of the vehicle 10 (see FIG. 1). However, from the standpoint of controlling the engine frequency fe in a manner so as to suppress the triple overlapping state, the present invention is not limited to this feature. For example, the engine 30 can be arranged on a rear side or in the center of the vehicle 10. The same features may also be applied to the fifth and sixth embodiments.

<H-3. Lockup Clutch 62>

In the fourth embodiment, the lockup clutch 62 is provided (see FIG. 1). However, from the standpoint of controlling the engine frequency fe in a manner so as to suppress the triple overlapping state, the present invention is not limited to this feature. For example, the lockup clutch 62 may be omitted. The same features may also be applied to the fifth and sixth embodiments.

<H-4. Propeller Shaft 40 (Torque Transmitting Rotary Body)>

According to the fourth embodiment, the propeller shaft 40 is offered as a torque transmitting rotary body that causes the occurrence of the triple overlapping state (see FIG. 1, for example). However, from the standpoint of controlling the engine frequency fe in a manner so as to suppress the triple overlapping state, the present invention is not limited to this feature. For example, the front shaft 34 or the rear shaft 46 may serve as the torque transmitting rotary body. The same features may also be applied to the fifth and sixth embodiments.

<H-5. ECU 122>

In the fourth embodiment, it was described that the ECU 122 is mounted in the vehicle 10 (see FIG. 1). However, for example, a portion of the ECU 122 may be disposed in a mobile terminal, and the ECU 122 may be configured by connecting the mobile terminal to a network of the vehicle 10. The same features may also be applied to the fifth and sixth embodiments.

According to the fourth embodiment, one ECU 122 controls both the power system 20 and the hydraulic system 22 (see FIG. 1). However, separate ECUs 122 may be provided independently for the power system 20 and the hydraulic system 22. Furthermore, among the components of the power system 20, it is also possible for separate ECUs 122 to be provided independently for the engine 30, the torque converter 60, and the CVT 64. The same features may also be applied to the fifth and sixth embodiments.

<H-6. Engine Output Control>

In the fourth embodiment, the inclinations of portions of the characteristics 1306, 1308, 1310 are changed by different methods to thereby suppress the occurrence of the triple overlapping state. However, from the standpoint of controlling the engine frequency fe in a manner so as to suppress the triple overlapping state, the present invention is not limited to this feature. For example, the method for changing the inclinations may be the same.

According to the fifth embodiment, the occurrence of the triple overlapping state is suppressed by switching the map 1330 (step S122 of FIG. 13). However, from the standpoint of controlling the engine frequency fe in a manner so as to suppress the triple overlapping state, the present invention is not limited to this feature. For example, in the case that the triple overlapping state is detected or predicted, the target engine frequency fetar may be increased or decreased by a predetermined value. In this case, the gear ratio R of the CVT 64 may be decreased or increased corresponding to the increase or decrease by the predetermined value.

According to the sixth embodiment, the map 1330 is switched on the basis of the angle of inclination A of the travel path (step S152 of FIG. 15). However, for example, from the standpoint of switching the map 1330 in accordance with changes in the vehicle 10B itself or the surrounding environment, the present invention is not limited to this feature.

For example, the map 1330 may be switched in accordance with the driving state (two-wheel drive/four-wheel drive) of the vehicle 10B. In this case, the ECU 122a (control device) implements a control of the engine frequency fe in order to suppress the triple overlapping state, on the condition that the vehicle 10B is in the two-wheel drive state. In accordance with this feature, switching of the engine frequency fe in order to suppress the triple overlapping state is performed only in the two-wheel drive state, and is not performed in the four-wheel drive state. Consequently, in the case that vibration of the propeller shaft 40 is likely to occur when the two-wheel drive state is in effect, it is possible to carry out switching of the engine frequency fe in an appropriate situation.

Alternatively, the map 1330 can be switched in accordance with the state (connected state/disconnected state) of the lockup clutch 62. As noted above, the propeller shaft resonant frequencies frp11, frp12 correspond with the state (connected state/disconnected state) of the lockup clutch 62. Therefore, in the case that the lockup clutch 62 is in the connected or engaged state, it is possible for the characteristic corresponding to the resonant frequency frp11 to be set, and for the resonant frequency frp12 not to be reflected. Similarly, in the case that the lockup clutch 62 is in the disconnected or non-engaged state, it is possible for the characteristic corresponding to the resonant frequency frp12 to be set, and for the resonant frequency frp11 not to be reflected. Alternatively, it is also possible to switch the map 1330 on the basis of the variation amount Q of the propeller shaft 40.

According to the sixth embodiment, the map 1330 is switched on the basis of the angle of inclination A [deg] of the travel path (step S152 of FIG. 15). However, for example, from the standpoint of switching the map 1330 in accordance with the inclination of the travel path, the present invention is not limited to this feature. For example, in the case that a map database of a non-illustrated navigation device includes road inclination information (flat road, uphill slope, downhill slope, etc.), it is also possible to determine the inclination of the travel path using such inclination information.

<H-7. Vibration/Noise Suppression Control>

In the fifth embodiment, the driving state (two-wheel drive state/four-wheel drive state) of the vehicle 10A is determined (step S131 of FIG. 14). However, for example, assuming that attention is paid to suppressing the triple overlapping state by switching the state of engagement of the lockup clutch 62, step S131 can be omitted.

According to the fifth embodiment, in the case that the triple overlapping state has occurred (step S133 of FIG. 14: TRUE), the rate of engagement Rc of the lockup clutch 62 is switched (step S134). However, for example, from the standpoint of suppressing the triple overlapping state by switching the state of engagement of the lockup clutch 62, the state of engagement of the lockup clutch 62 can also be switched using an index other than the rate of engagement Rc. For example, in the case that the lockup clutch 62 is in the connected or engaged state when the triple overlapping state is detected or predicted, the lockup clutch 62 may be switched to a released or non-engaged state (rate of engagement Rc=0). Conversely, in the case that the lockup clutch 62 is in the released or non-engaged state when the triple overlapping state is detected or predicted, the lockup clutch 62 may be switched to a connected or engaged state (rate of engagement Rc=a predetermined value other than zero).

According to the fifth embodiment, both the engine output control and the vibration/noise suppression control are performed (see FIGS. 13 and 14). However, for example, from the standpoint of suppressing the triple overlapping state by switching the state of engagement of the lockup clutch 62, the present invention is not limited to this feature, and only the vibration/noise suppression control may be performed. Conversely, it is also possible to perform only the engine output control of the fifth embodiment, and not to perform the vibration/noise suppression control.

According to the fifth embodiment, the determination as to whether or not the triple overlapping state has occurred (step S133 of FIG. 14) is carried out on the basis of the variation amount Q of the propeller shaft 40. However, from the standpoint of determining the triple overlapping state, the present invention is not limited to this feature. For example, in the map 1330, the triple overlapping regions 1320, 1322, 1324 are actually set in advance, and the triple overlapping state may be determined, in accordance with whether or not the combination of the vehicle velocity V and the engine frequency fe lies within any of the regions 1320, 1322, 1324.

According to the fifth embodiment, a determination is made as to whether or not the triple overlapping state is occurring (step S133 of FIG. 14). Stated otherwise, it is determined whether or not the triple overlapping state was actually detected. However, from the standpoint of suppressing the occurrence of vibrations or noises in the triple overlapping state, the present invention is not limited to this feature. For example, a determination can be made as to whether or not an occurrence of the triple overlapping state is predicted. Such a prediction can be carried out, for example, using the target engine frequency fetar on the basis of the AP operation amount θap and the vehicle velocity V, instead of the engine frequency fe (detected value) as detected by the engine frequency sensor 134. Alternatively, the prediction may be carried out by slightly expanding the triple overlapping regions 1320, 1322, 1324 in FIG. 11. The same features may also be applied to the fifth and sixth embodiments.

<H-8. Other Considerations>

In the fifth embodiment, the engine output control is performed in accordance with the process flow shown in FIG. 13. However, for example, insofar as the effects of the present invention can be obtained, the content of the process flow (the order of the respective steps thereof) is not limited to that shown in FIG. 13. For example, the vehicle velocity V and the engine frequency fe may be obtained after step S122. The same features may also be applied to the fourth and sixth embodiments. Further, the same features may also be applied to controls other than the engine output control (the vibration/noise suppression control or the like).

In the above-described fourth to sixth embodiments, in comparing the numerical values, there are cases in which equal signs are included and cases in which equal signs are not included (refer to step S133 of FIG. 14 and the like). However, for example, assuming there is no special significance to including or excluding such equal signs (or stated otherwise, insofar as the effects of the present invention can be obtained), whether to include or not include equal signs in the comparison of the numerical values can be set arbitrarily.

In that sense, for example, the determination as to whether or not the variation amount Q in step S133 of FIG. 14 is greater than or equal to the second variation amount threshold value THq2 (Q≥THq2) may be replaced by a determination as to whether or not the variation amount Q is greater than the second variation amount threshold value THq2 (Q>THq2).

Further, any two or more of the first to sixth embodiments may be combined.

What is claimed is:

1. A vehicle comprising:
 a rotary drive source configured to generate a drive torque for the vehicle;
 a continuously variable transmission arranged in a power transmission path from the rotary drive source to vehicle wheels, and including a drive pulley, a driven pulley, and an endless belt;

a torque transmitting rotary body configured to transmit the drive torque in the power transmission path;

a drive source frequency sensor configured to acquire a drive source frequency, which is a rotational frequency of the rotary drive source; and a control device configured to control the continuously variable transmission;

wherein, when a frequency of a harmonic of the drive source frequency is defined as a harmonic frequency, a resonant frequency of the torque transmitting rotary body is defined as a rotary body resonant frequency, and a resonant frequency of the endless belt is defined as a belt resonant frequency, the control device controls the belt resonant frequency in a manner so as to suppress a triple overlapping state in which the drive source frequency or the harmonic frequency, the rotary body resonant frequency, and the belt resonant frequency coincide with or closely approximate each other.

2. The vehicle according to claim 1, wherein when the triple overlapping state is detected or predicted, the control device temporarily changes a force that acts on the endless belt in a direction of movement of the endless belt, and thereby temporarily changes the belt resonant frequency.

3. The vehicle according to claim 1, wherein:
the vehicle further comprises a vehicle velocity sensor configured to acquire a vehicle velocity of the vehicle;
the control device comprises a storage unit configured to store a map defining a relationship between the triple overlapping state and a combination of the drive source frequency and the vehicle velocity; and
the control device further detects or predicts the triple overlapping state, based on the combination of the drive source frequency and the vehicle velocity in the map.

4. The vehicle according to claim 3, wherein:
the vehicle further comprises a rotary body variation amount sensor configured to acquire rotary body variation amounts, which are variation amounts of the torque transmitting rotary body;
the map defining the relationship between the triple overlapping state and the combination of the drive source frequency and the vehicle velocity is one of a plurality of maps, and the storage unit stores the plurality of maps, one for each of the rotary body variation amounts; and
the control device switches the map, based on the rotary body variation amounts.

5. The vehicle according to claim 3, wherein:
the vehicle further comprises an inclination determining unit configured to determine inclinations of a travel path of the vehicle;
the map defining the relationship between the triple overlapping state and the combination of the drive source frequency and the vehicle velocity is one of a plurality of maps, and the storage unit stores the plurality of maps, one for each of the inclinations; and
the control device switches the map, based on the inclinations.

6. The vehicle according to claim 1, wherein:
the vehicle further comprises a rotary body variation amount sensor configured to acquire a rotary body variation amount, which is a variation amount of the torque transmitting rotary body; and the control device detects or predicts the triple overlapping state, based on the rotary body variation amount.

7. The vehicle according to claim 1, wherein:
the vehicle is configured to switch between a four-wheel drive state and a two-wheel drive state;
the rotary drive source is an engine; and
the torque transmitting rotary body is a propeller shaft;
wherein the control device executes switching of the belt resonant frequency in order to suppress the triple overlapping state, on condition that the vehicle is in the two-wheel drive state.

8. The vehicle according to claim 1, wherein:
the vehicle further comprises a lockup clutch; and
when the triple overlapping state is detected or predicted, the control device changes a state of engagement of the lockup clutch.

9. A control method for a vehicle, the vehicle comprising:
a rotary drive source configured to generate a drive torque for the vehicle;
a continuously variable transmission arranged in a power transmission path from the rotary drive source to vehicle wheels, and including a drive pulley, a driven pulley, and an endless belt;
a torque transmitting rotary body configured to transmit the drive torque in the power transmission path;
a drive source frequency sensor configured to acquire a drive source frequency, which is a rotational frequency of the rotary drive source; and
a control device configured to control the continuously variable transmission;
the control method comprising, with the control device, controlling a belt resonant frequency in a manner so as to suppress a triple overlapping state in which the drive source frequency or a harmonic frequency, a rotary body resonant frequency, and a belt resonant frequency coincide with or closely approximate each other, wherein the harmonic frequency denotes a frequency of a harmonic of the drive source frequency, the rotary body resonant frequency denotes a resonant frequency of the torque transmitting rotary body, and the belt resonant frequency denotes a resonant frequency of the endless belt.

10. A vehicle comprising:
a rotary drive source configured to generate a drive torque for the vehicle;
a continuously variable transmission arranged in a power transmission path from the rotary drive source to vehicle wheels, and including a drive pulley, a driven pulley, and an endless belt;
a torque transmitting rotary body configured to transmit the drive torque in the power transmission path;
a drive source frequency sensor configured to acquire a drive source frequency, which is a rotational frequency of the rotary drive source;
a vehicle velocity sensor configured to acquire a vehicle velocity of the vehicle; and
a control device configured to control the rotary drive source based on the drive source frequency and the vehicle velocity;
wherein, when a frequency of a harmonic of the drive source frequency is defined as a harmonic frequency, a resonant frequency of the torque transmitting rotary body is defined as a rotary body resonant frequency, and a resonant frequency of the endless belt is defined as a belt resonant frequency, the control device controls the drive source frequency in a manner so as to suppress a triple overlapping state in which the drive source frequency or the harmonic frequency, the rotary body resonant frequency, and the belt resonant frequency coincide with or closely approximate each other.

11. The vehicle according to claim 10, wherein:
the control device comprises a storage unit configured to store a map defining a relationship between the drive source frequency and the vehicle velocity; and
in the map, the relationship between the drive source frequency and the vehicle velocity is defined so as to suppress the triple overlapping state.

12. The vehicle according to claim 11, wherein:
the vehicle further comprises a rotary body variation amount sensor configured to acquire rotary body variation amounts, which are variation amounts of the torque transmitting rotary body;
the map defining the relationship between the drive source frequency and the vehicle velocity is one of a plurality of maps, and the storage unit stores the plurality of maps, one for each of the rotary body variation amounts; and
the control device switches the map, based on the rotary body variation amounts.

13. The vehicle according to claim 10, wherein:
the vehicle further comprises a rotary body variation amount sensor configured to acquire a rotary body variation amount, which is a variation amount of the torque transmitting rotary body; and
the control device detects or predicts the triple overlapping state, based on the rotary body variation amount.

14. The vehicle according to claim 10, wherein:
the vehicle is configured to switch between a four-wheel drive state and a two-wheel drive state;
the rotary drive source is an engine; and
the torque transmitting rotary body is a propeller shaft.

15. The vehicle according to claim 10, wherein:
the vehicle further comprises an inclination determining unit configured to determine an inclination of a travel path of the vehicle; and
the control device switches a correspondence relationship between the drive source frequency and the vehicle velocity depending on the inclination.

16. The vehicle according to claim 10, wherein:
the vehicle further comprises a lockup clutch; and
when the triple overlapping state is detected or predicted, the control device changes a state of engagement of the lockup clutch.

17. A control method for a vehicle, the vehicle comprising:
a rotary drive source configured to generate a drive torque for the vehicle;
a continuously variable transmission arranged in a power transmission path from the rotary drive source to vehicle wheels, and including a drive pulley, a driven pulley, and an endless belt;
a torque transmitting rotary body configured to transmit the drive torque in the power transmission path;
a drive source frequency sensor configured to acquire a drive source frequency, which is a rotational frequency of the rotary drive source;
a vehicle velocity sensor configured to acquire a vehicle velocity of the vehicle; and
a control device configured to control the rotary drive source based on the drive source frequency and the vehicle velocity;
the control method comprising, with the control device, controlling the drive source frequency in a manner so as to suppress a triple overlapping state in which the drive source frequency or a harmonic frequency, a rotary body resonant frequency, and a belt resonant frequency coincide with or closely approximate each other, wherein the harmonic frequency denotes a frequency of a harmonic of the drive source frequency, the rotary body resonant frequency denotes a resonant frequency of the torque transmitting rotary body, and the belt resonant frequency denotes a resonant frequency of the endless belt.

* * * * *